United States Patent [19]

Reznik

[11] Patent Number: 5,607,613
[45] Date of Patent: Mar. 4, 1997

[54] ELECTROHEATING OF FOOD PRODUCTS USING LOW FREQUENCY CURRENT

[76] Inventor: David Reznik, 2151 Barbara Dr., Palo Alto, Calif. 94303

[21] Appl. No.: 465,858

[22] Filed: Jun. 6, 1995

Related U.S. Application Data

[62] Division of Ser. No. 125,933, Sep. 23, 1993, abandoned.

[51] Int. Cl.$^6$ ..................................... H05B 6/60
[52] U.S. Cl. .......................... 219/771; 219/780; 392/338; 426/244; 99/358
[58] Field of Search .................................. 219/771, 780; 99/358, DIG. 14, 451; 426/244, 614; 392/317, 331, 338

[56] References Cited

U.S. PATENT DOCUMENTS

| | | |
|---|---|---|
| 731,339 | 6/1903 | Chapman . |
| 1,147,558 | 7/1915 | Shelmerdine . |
| 1,360,447 | 11/1920 | Rudd . |
| 1,522,188 | 1/1925 | Hull . |
| 1,775,579 | 9/1930 | Woodrich . |
| 1,813,064 | 7/1931 | Matzka . |
| 1,934,703 | 11/1933 | Golden . |
| 2,081,243 | 5/1937 | Macy . |
| 2,438,582 | 3/1948 | Southerwick . |
| 2,473,041 | 6/1949 | Urbain et al. . |

(List continued on next page.)

FOREIGN PATENT DOCUMENTS

| | | |
|---|---|---|
| 230978A | 8/1987 | European Pat. Off. . |
| 2513087 | 3/1983 | France . |
| 639158 | 12/1978 | U.S.S.R. . |
| 683034 | 8/1979 | U.S.S.R. . |
| 904371 | 8/1962 | United Kingdom . |
| 2068200 | 8/1981 | United Kingdom . |
| 2140668 | 12/1984 | United Kingdom . |
| WO8900384 | 1/1989 | WIPO . |
| WO9015547 | 12/1990 | WIPO . |
| WO9319620 | 10/1993 | WIPO . |

OTHER PUBLICATIONS

Palaniappan, S., "Ohmic Heating of Foods: Studies on Microbicidal Effect of Electricity, Electrical Conductivity of Foods, and Heat Transfer In," Ph.D. Thesis, The Ohio State University, 1991.

Palaniappan, S. et al., "Effects of Electricity on Microorganisms: A review," Journal of Food Processing and Preservation vol. 14, No. 5 (Oct., 1990), pp. 383–414.

Palaniappan, S. et al., "Experimental Studies on Electroconductive (Ohmic) Heating of Liquids," prepared fro an American Society of Agriculture Engineers Meeting Presentation (Dec. 12–15, 1989), Paper No. 89–6553.

(List continued on next page.)

*Primary Examiner*—Philip H. Leung
*Attorney, Agent, or Firm*—Fish & Neave; Jeffrey H. Ingerman

[57] ABSTRACT

An electroheating cell operating at low voltage and mains frequency, i.e., 60 Hz, is effective in heating a variety of food products including liquid egg products for general processing, as well as pasteurization and sterilization. The electroheating cell includes at least a pair of spaced electrode assemblies each including an electrode spaced from a barrier in contact with the food product by a gap containing an electrolyte solution.

39 Claims, 11 Drawing Sheets

U.S. PATENT DOCUMENTS

| | | |
|---|---|---|
| 2,495,415 | 1/1950 | Marshall . |
| 2,510,796 | 6/1950 | Brown . |
| 2,550,584 | 4/1951 | Mittelmann . |
| 2,564,579 | 8/1951 | Parmenter et al. . |
| 2,565,311 | 8/1951 | Koonz et al. . |
| 2,582,281 | 1/1952 | Robertson . |
| 2,585,970 | 2/1952 | Shaw . |
| 2,685,833 | 8/1954 | Hagopian . |
| 2,799,216 | 7/1957 | Coulter . |
| 2,838,640 | 6/1958 | Mann et al. . |
| 3,315,681 | 4/1967 | Poppendiek . |
| 3,625,843 | 12/1971 | Doevenspeck ............ 426/241 |
| 3,632,962 | 1/1972 | Cherniak .................. 99/358 |
| 3,709,802 | 1/1973 | Okuhara et al. ............ 426/239 |
| 3,753,886 | 8/1973 | Myers . |
| 3,796,857 | 3/1974 | Henley et al. . |
| 3,855,531 | 12/1974 | Fielibert et al. ............ 426/107 |
| 3,867,610 | 2/1975 | Quaintance . |
| 3,877,360 | 4/1975 | Vigerstrom . |
| 3,919,052 | 11/1975 | Fresnel et al. . |
| 3,949,099 | 4/1976 | Kaufman . |
| 4,091,119 | 5/1978 | Bach . |
| 4,109,566 | 8/1978 | Vigerstrom . |
| 4,177,719 | 12/1979 | Balaguer . |
| 4,260,874 | 4/1981 | Will .......................... 392/331 |
| 4,417,132 | 11/1983 | Simpson . |
| 4,420,382 | 12/1983 | Riedl . |
| 4,434,357 | 2/1984 | Simpson et al. . |
| 4,457,221 | 7/1984 | Geren . |
| 4,496,594 | 1/1985 | Miyahara . |
| 4,522,834 | 6/1985 | Miyahara . |
| 4,524,079 | 6/1985 | Hofmann . |
| 4,695,472 | 9/1987 | Dunn et al. . |
| 4,723,483 | 2/1988 | Papchenko et al. . |
| 4,739,140 | 4/1988 | Reznik . |
| 4,808,425 | 2/1989 | Swartzel et al. . |
| 4,836,110 | 5/1983 | Komeyasu et al. ............ 426/244 |
| 4,838,154 | 6/1989 | Dunn et al. . |
| 4,853,238 | 8/1989 | Huang . |
| 4,857,343 | 8/1989 | Hekal . |
| 4,871,559 | 10/1989 | Dunn et al. . |
| 4,957,759 | 9/1990 | Swartzel et al. . |
| 4,957,760 | 9/1990 | Swartzel et al. . |
| 4,959,525 | 9/1990 | Stirling et al. . |
| 4,971,819 | 11/1990 | Miyahara ................ 426/244 |
| 4,971,827 | 11/1990 | Huang . |
| 4,994,291 | 2/1991 | Swartzel et al. . |
| 5,019,407 | 5/1991 | Swartzel et al. . |
| 5,019,408 | 5/1991 | Swartzel et al. . |
| 5,048,404 | 9/1991 | Bushnell et al. . |
| 5,084,153 | 1/1992 | Mosse et al. . |
| 5,085,882 | 2/1992 | Rausing . |
| 5,091,152 | 2/1992 | Thomas, Sr. . |
| 5,105,724 | 4/1992 | Swartzel et al. . |
| 5,167,976 | 12/1992 | Papetti . |
| 5,226,106 | 7/1993 | Stirling . |
| 5,235,905 | 8/1993 | Bushnell et al. . |
| 5,266,338 | 11/1993 | Cascione et al. . |
| 5,288,471 | 2/1994 | Corner . |
| 5,290,583 | 3/1994 | Reznik et al. . |
| 5,326,530 | 7/1994 | Bridges . |

OTHER PUBLICATIONS

Parrott, D. L. et al., "The Aseptic Processing of Fluids Containing Particulates from ⅛" to 1" size," prepared for presentation at American Institution of Chemical Engineers 1988 Summer Meeting (Aug. 21–24, 1988) (Unpublished), Paper No, 60e.

Parrott, D. L., "Use of Ohmic Heating for Aseptic Processing of Food Particulates," Food Technology (Dec., 1992), pp. 68–72.

Reznik, D., "Electroheating," Dec., 1989.

Sastry, S. K., "A Modeling for Heating of Liquid–Particle Mixtures in a Continuous Flow Ohmic Heater," Journal of Food Process Engineering 15 (1992), pp. 263–278.

Sastry, S. K. et al., "Mathematical Modeling and Experimental Studies on Ohmic Heating of Liquid–Particle Mixtures in a Static Heater," Journal of Food Process Engineering 15 (1992), pp. 241–261.

Sastry, S. K. et al., "Ohmic Heating of Liquid–Particle Mixtures," Food Technology (Dec., 1992), pp. 64–67.

Alkskkog, L., "High Temperature pasteurization of Liquid Whole Egg,"Process Technology, pp. 16–18.

Hamid–Samimi, M. H. et al., "Aseptic Packaging of Ultrapasteurized Egg, Design and Economic Considerations," publication date unknown, but a copy was transmitted to Mr. Merle Kirk under cover of a letter dated Aug. 21, 1985 from Prof. Hersell Ball, Jr.

Hanson et al., "Pasteurization Of Liquid Egg Products," Received for publication Nov. 16, 1946 pp. 277–283.

Murdock et al., "The Pasteurization Of Liquid Whole Egg," issued from the Office of Medical Research Council, 38, Old Queen Street, Westminster, S.W.I.

Russell, M. J., "Live Long and Prosper," Food Engineering, Dec., 1992, pp. 77–80.

Winter et al., "Pasteurization of Liquid–Egg Products. I. Bacteria Reduction in Liquid Whole Egg and Improvement in Keeping Quality," Journal Paper No. J–1300 of the Town Agricultural Experimental Station, received from publication on Jun. 18, 1945, 229–245.

Winter et al., "Pasteurization of Liquid Egg Products III. Destruction of Salmonella in Liquid Whole Egg," American Journal of Public Health, vol. 36, pp. 451–460, (1946).

"Annual Report of Cooperative Regional Projects" Supported by Allotment of the Regional Fund, Hatch Act, as Amended Aug. 11, 1955, Jan. 1 to Dec. 31, 1984, Raleigh, North Carolina. Approved by Chariman Hershell Ball, Jr. on Mar. 14, 1985.

Ball, H. R. Jr. et al., "Function and Shelf Life of Ultrapasteurized, Aseptically packaged Whole Egg" Abstract, Poultry Science Association Annual Meeting—Jul. 29–Aug. 2, 1985, Iowa State University, Ames.

Dinnage, D. F., "Continuous Aseptic Processing Using the Ohmic Heating Process," CHanging Food Technology 3, Food Technology: A view of the Future (Selected Papers from the Sixth Eastern Food Science & Technology Conference), Edited by Allen Freed (1990), pp. 29–41.

Essary, E. O. et al., "New Uses of Heated Aseptically Packaged Fluid Egg Products," Departments of Food Science and Technology, and Chemical Engineering, Virginia Polytechnic Institute and State University, Blacksburg, VA, 1983.

Hamid–Samimi, M. H., "Criteria Development for Extended Shelf–Life Pasteurized Liquid Whole Egg," Ph.D. Thesis, North Carolina State University, Raleigh, North Carolina, 1984.

Jacobs, L. C., "Aseptic packaging promises new role for pasteurized liquid eggs," Apr., 1981.

Sill, M., "NSCU researchers crack the secret of long shelflife for eggs," The News and Observer, Raleigh, North Carolina, Sep. 3, 1985.

Stone, W. K. et al., "Aseptic Processing of Liquid Eggs Pasteurized in a Teflon Heat Exchanger," 1983.

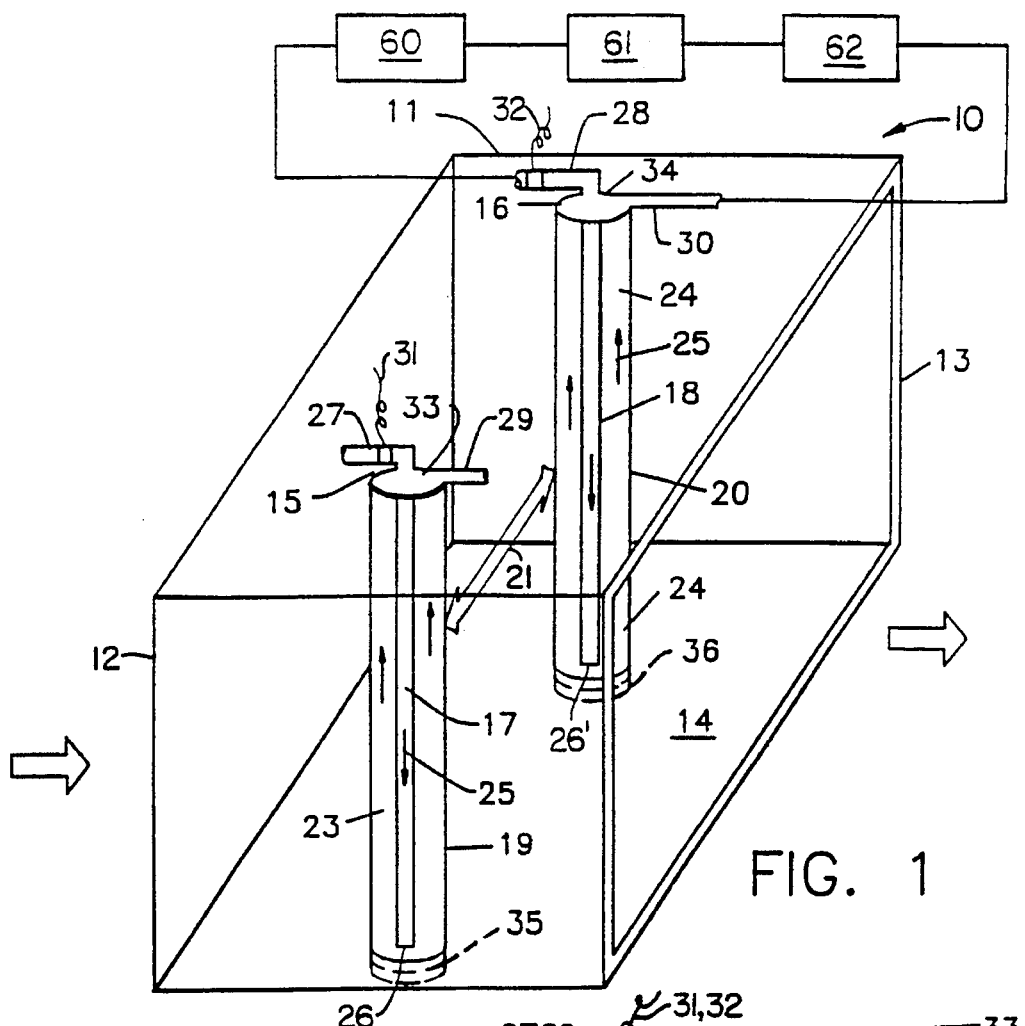
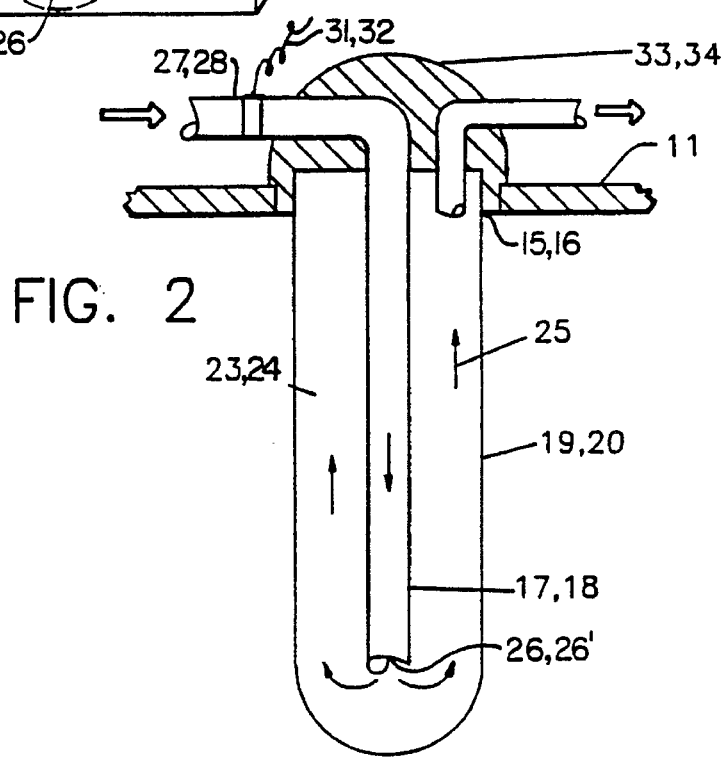

ELECTROHEATING OF FOOD PRODUCTS USING LOW FREQUENCY CURRENT

This is a division of application Ser. No. 08/125,933, filed Sep. 23, 1993, entitled ELECTROHEATING OF FOOD PRODUCTS USING LOW FREQUENCY CURRENT, now abandoned.

FIELD OF THE INVENTION

The present invention relates in general to the field of food processing and, more particularly, to methods and apparatus which are useful for the heat treatment of food products.

BACKGROUND OF THE INVENTION

The treatment of food products by the application of electrical energy is by no means a new endeavor. In recent years, however, it has undergone somewhat of a renaissance due to a number of obtainable advantages. Electrical based process techniques can offer rapid heating times, high temperature changes and very uniform efficient energy application. However, the known techniques generally suffer from shortcomings which have limited their desirability and utility in food product treatment.

Principal amongst the difficulties associated with the electrical treatment of food products is the resulting electrochemical process of electrolysis. One form of electrolysis results in the dissolution of the metal electrodes inserted into the food product being treated. As ions flow between the pair of electrodes, the metal at the surface of the electrodes becomes ionized by releasing electrons to positive ions in the solution. The metal ions then dissolve into the food product being treated.

Another electroheating problem is caused by the conversion of conductive ionic species within the food product being treated to radicals and molecules, such as the conversion of a hydrogen ion to hydrogen atoms or gas and chlorine ions to chlorine atoms or chlorine gas molecules. Hydroxide ions can form hydroxyl free radicals and subsequently can be converted to water and oxygen. These conversions can adversely impact the flavor and other advantageous qualities of the treated food product both as a result of the direct depletion of ions and their subsequent conversion to other species and by initiating other reactions within the food product such as oxidation and reduction.

The food science industry has recognized the electroheating problems associated with the electrical treatment of food products and has attempted to respond in a number of ways. For example, U.S. Pat. No. 4,739,140 (the "'140 patent") describes an electroheating technique using high frequency AC electric current. The inventor, (also the present inventor), found that when frequencies exceeding typical household frequency, and in particular, exceeding 100 kHz are applied through conventional metal electrodes, both forms of electrolysis, i.e. dissolution of the electrodes and conversion of, for example, ions to gas molecules, are avoided. While this technology offers the clear advantages of eliminating electrolysis in the heat treatment of food products, it nonetheless requires the use of expensive equipment to generate the high frequency alternating current. Some food product processors would consider the capital expenditures necessary for such equipment to be prohibitive.

U.S. Pat. No. 4,695,472, (the "'472 patent") discusses methods and apparatus for extending the refrigerated shelf life of fluid food products including eggs. The technique involves the repeated application of high voltage, high current density, discrete electric pulses to the food products. Field strengths used are, at a minimum, 5,000 volts/cm and voltages as high as, for example, 37,128 volts are disclosed. Direct current densities of at least about 12 amps/cm$^2$ are also disclosed as are pulse frequencies of between 0.1 and 100. Preferably, the treatment involves the application of at least 2 and, more preferably, at least 5 discrete high energy pulses to the food product being treated.

The '472 patent suggests that different forms of energy, i.e. the application of different types of pulses, can result in different effects on the treated food product. For example, the '472 patent discloses the use of flat-top electric field pulses where heating is to be kept to a minimum and exponentially decaying pulses where heating by high energy electric field is beneficial.

The '472 patent recognizes the problems associated with electrolysis and suggests a device which purports to eliminate these problems. The device optionally includes plate electrodes separated from the food product being treated by a membrane. An electrolyte is placed between the membrane and the electrode such that the effects of electrolysis, if any, are limited to the electrolyte and do not impact the food product being treated. Apparently, this technology was not principally designed to heat food products so as to cause the destruction of bacteria, but rather to utilize electrical pulses, often in combination with heat, and their destructive nature directly. This is evident by the disclosed material used to construct the electrode cell, and the membrane in particular. It has been found that the materials disclosed as useful membranes generally would not be useful to all electrical applications. In particular, it is believed that such membranes could not withstand the heat generated by the continuous flow of some forms of electrical energy, particularly over long periods of time.

In addition, while the use of pulses to effect an increase in extended refrigerated shelf life is disclosed, the '472 patent does not teach or suggest electroheating as described in the '140 patent or herein. For example, in treating liquid whole egg containing preservatives, the '472 patent exemplifies attaining a temperature of about 136° F. This is significantly below the temperatures recognized by the United States government as necessary for thermally pasteurizing liquid whole egg. Nevertheless, extended refrigerated shelf life was realized. Clearly, therefore, the '427 patent is not relying on a thermal based method of pasteurization.

Another approach offered by APV U.K. Ltd. is the use of rare metals such as gold or platinum or other exotic alloys to construct or coat the electrodes. These particular materials do not exhibit the dissolution associated with more common materials such as stainless steel. See U.S. Pat. No. 4,959,525. On the other hand, this solution ignores other aspects of electrolysis previously described which also effect the flavor and quality of the food product being treated.

An electroheating apparatus using metal electrodes in direct contact with food products other than liquid egg products using AC voltage of less than 650 volts and a frequency of about 50 Hz is known from International Application No. PCT/GB88/00566. As a result of the low frequency and the direct contact of the food product with the metal electrodes, it is expected that the metal electrodes through electrolysis will slowly dissolve and contaminate the treated food product. It is precisely this problem of dissolution of the electrodes that was overcome by the '140 patent. In addition, the International Application recognizes that the food product being heat treated will ultimately bake upon the electrode surface. This necessitates the use of a scraper assembly to periodically scrape the interior of the electrode apparatus and the electrode surfaces. Obviously, any electroheating apparatus which is known to cause fouling of the electrodes by detrimental baking of the food product, is not suitable for use with delicate heat sensitive food products such as liquid egg products and the like.

Thus, for one reason or another, all of the potential solutions known to date are either incomplete, economically prohibitive or inconvenient to implement. The present invention provides for an inexpensive alternative to the use of high frequency devices such as those described in the '140 patent and/or high voltage-high energy pulse devices such as those described in the '472 patent. At the same time, the present invention affords complete protection from electrolysis, whether or not rare earth metal electrodes are used.

It has been discovered that with the right processing safeguards, relatively low frequency electrical energy (less than 100 kHz and preferably less than 100 Hz) having a sinusoidal wave form and, in particular, typical mains frequency (i.e., about 60 Hz in the United States, 50 Hz in Europe), can be drawn straight from a conventional outlet and used to electroheat food products. This can be accomplished without excessive cost, inconvenience, or concern over electrolysis.

SUMMARY OF THE INVENTION

It is broadly one object of the present invention to provide a method of processing food products by the application of heat.

It is another object of the present invention to provide a method of processing food products by the application of electrical energy thereto using the resistance of the food product to generate heat.

It is more specifically an object of the present invention to provide a method of electroheating food products so as to avoid electrolysis of the food product being treated and/or the introduction of undesirable contaminants into the food product as a result of electrolysis.

It is another object of the present invention to provide a method of electroheating food products which can be accomplished using relatively low frequency, low voltage electrical energy thereby avoiding the need for high frequency or high voltage equipment of the known methods.

It is another object of the present invention to provide for electroheating food products such that the food product is not in contact with metal during heating.

In accordance with these objectives, there is provided a method of electroheating food products which includes the steps of providing a food product to be heated; and placing the food product into an electroheating cell which includes a pair of opposed electrodes separated from the food product by a pair of barriers. The distance between the barriers defines a heating zone therebetween for heating the food product. The electrodes and the barriers are disposed apart so as to define a gap therebetween containing an electrolyte. The food product is electroheated to a first temperature by application thereto of alternating electrical energy in the form of a sinusoidal wave across the electrodes and thereby the electrical energy is transferred through the food product in the heating zone.

In accordance with this method, food products can be electroheated safely, efficiently, and economically using generally low voltage, low frequency alternating electric current having a sinusoidal wave form. In particular, these methods use relatively low frequency current taken directly from a normal everyday electrical outlet, without the problems normally associated with electrolysis.

It is another object of the present invention to provide a method of thermally treating food products containing pathogenic bacteria, spoilage bacteria or both by the use of electroheating to result in the destruction of at least some of the bacteria in the food product.

It is another object of the present invention to provide a method of pasteurizing and/or sterilizing food product by electroheating using relatively low frequency electrical energy, thereby avoiding the need for the use of expensive high frequency or high voltage equipment as currently practiced.

In accordance with these objectives and in another aspect of the present invention, there is provided a method of thermally treating food products containing pathogenic bacteria, spoilage bacteria or both which includes the steps of providing a bacteria containing food product and placing the food product into an electroheating cell comprising a pair of opposed electrodes separated from the food product by a pair of barriers. The barriers define a heating zone therebetween for heating the food product. The electrodes and the barriers are disposed apart so as to define a gap therebetween, the gap containing an electrolyte. The food product is then electroheated to a first temperature by exposing the food product to continuous alternating electrical energy in the form of a sinusoidal wave across said electrodes such that the electrical energy is transferred to the food product. The food product is then maintained at the first temperature for a first period of time sufficient to provide a level of thermal exposure to the bacteria which will result in the destruction of at least some of the bacteria in the food product.

In accordance with a particularly preferred aspect of the present invention, there is provided a method of thermally treating a food product containing pathogenic bacteria, spoilage bacteria or both as described above wherein the food product is electroheated to a first temperature and held for a first time so as to provide effective pasteurization. Pasteurization is conducted in such a way as to minimize detrimental coagulation where the food product being treated is a coagulable liquid such as, for example, liquid egg. Methods of sterilizing and cooking food products are also contemplated.

It is another object of the present invention to provide an apparatus which may be used to heat food products electrically in a rapid and efficient manner using readily available, low cost forms of energy.

It is another object of the present invention to provide an apparatus which can be used to heat food products electrically without concern for the potentially harmful effects of electrolysis.

Finally, it is another object of the present invention to provide an apparatus which is relatively inexpensive to build, operate, and maintain.

In accordance with these objectives, there is provided an apparatus for electroheating a food product. The apparatus includes an electroheating cell. The electroheating cell includes a housing; a pair of opposed electrodes disposed in the housing, the electrodes being separated from direct contact with the food product to be treated by a pair of barriers. The barriers define a heating zone therebetween for heating the food product to be treated. The electrodes and the barriers are disposed apart so as to define a gap therebetween containing an electrolyte. A source of alternating electrical energy in the form of a sinusoidal wave is electrically connected to the electrodes so as to apply the electrical energy to the food product as the food product travels into and through the heating zone.

In accordance with a more specific embodiment in accordance with the present invention, there is provided an apparatus for electroheating a food product comprising at least one electroheating cell, the electroheating cell including a housing having a non-conductive interior surface, a food product inlet, a food product outlet, at least one pair of hollow rod electrodes, the electrodes being separated from direct contact with the food product by a pair of barriers. The barriers have a hollow circular cross-section and are composed of a porous conductive, non-reactive, non-metallic material. The barrier must also have sufficient strength and dimensional stability to withstand the continuous passage of alternating electrical energy, the continuous exposure to temperatures generally above 100° F., and the ability to withstand the application of positive pressure thereto. Each of the electrodes is disposed within each of the barriers, but maintained apart from intimate contact with the barriers so as to define a gap containing an electrolyte. A source of alternating electrical energy in the form of a sinusoidal wave having a frequency of between about 50 Hz and about 99 kHz, is provided and is electrically connected to the electrodes.

In accordance with one embodiment of the present invention there is described a method of electroheating a food product comprising the steps of: supplying a food product to be heated; passing the food product through an electroheating zone in an electroheating cell defined between a pair of spaced electrode assemblies, the electrode assemblies each comprising an electrode spaced from a barrier in contact with the food product by a gap containing an electrolyte; and applying alternating electrical energy having a frequency in the range of between about 50 Hz and about 99 kHz across the electrodes and through the food product to electroheat the food product to a first temperature.

In accordance with another embodiment of the present invention there is described a method of thermally treating food products containing pathogenic bacteria, spoilage bacteria or both, the method comprising the steps of: supplying a food product containing the bacteria; passing the food product through an electroheating zone in an electroheating cell defined between a pair of spaced electrode assemblies, the electrode assemblies each comprising an electrode spaced from a barrier in contact with the food product by a gap containing an electrolyte; exposing the food product to alternating electrical energy having a frequency of between about 50 Hz and about 99 kHz applied across the electrodes and through the food product to electroheat the food product to a first temperature; and maintaining the food product at the first temperature for a period of time sufficient to provide a level of thermal exposure to the bacteria which will result in the destruction of at least some of the bacteria in the food product.

In accordance with another embodiment of the present invention there is described an apparatus for electroheating a food product, the apparatus comprising an electroheating cell including a housing, at least a pair of spaced electrode assemblies disposed in the housing, the electrode assemblies each comprising an electrode spaced from a barrier in contact with the food product by a gap containing an electrolyte; a heating zone defined between the electrode assemblies for heating the food product; and a source of alternating electrical energy having a frequency in the range of between about 50 Hz and about 99 kHz electrically connected across the electrodes for electroheating the food product within the heating zone.

In accordance with another embodiment of the present invention there is described an apparatus for electroheating a food product, the apparatus comprising an electroheating cell including a housing, a plurality of spaced electrode assemblies disposed in the housing and arranged in a first, second, third and fourth group each including at least one of the electrode assemblies, the electrode assemblies each comprising an electrode spaced from a barrier in contact with the food product by a gap containing an electrolyte, the first and second group respectively arranged in longitudinal alignment with the third and fourth group; cooling means for cooling the electrolyte during the heating of the food product; a heating zone defined between the first and second group and the third and fourth group for heating the food product; and a source of alternating electrical energy having a sinusoidal wave form and a frequency in the range of between about 50 Hz and about 99 kHz, the electrical energy having a plurality of phases electrically connected to the electrodes within the first, second, third and fourth groups for electroheating the food product within the heating zone.

BRIEF DESCRIPTION OF THE DRAWINGS

The preferred embodiments of the present invention will be described in greater detail with reference to the accompanying drawings, wherein like members bear like numerals and wherein:

FIG. 1 is a perspective diagrammatic view of an electroheating cell in accordance with one embodiment of the present invention.

FIG. 2 is a partial cross-sectional side view of an electrode and barrier structure in accordance with one embodiment of the present invention.

DETAILED DESCRIPTION OF THE PREFERRED EMBODIMENTS

Figures 3A, 3B:
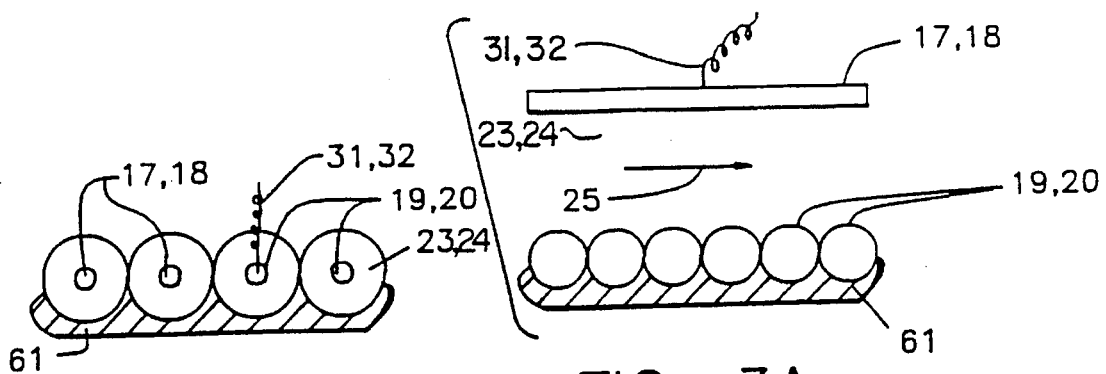
FIG. 3A is a top plan view of an electrode assembly including a plate electrode disposed behind a multicell barrier layer.
FIG. 3B is a top plan view of an alternate arrangement of an electrode assembly including a plurality of electrodes and barriers in accordance with the present invention where the electrodes are contained within the barriers.

Electroheating of food products in accordance with the present invention can be conducted either as a batch or as a continuous process. Because of the efficiencies and high process rates, continuous processing techniques and apparatus are preferred. One apparatus useful in accordance with one embodiment of the present invention for continuously electroheating a food product is an electroheating cell 10 as diagrammatically shown in FIG. 1. Electroheating cell 10 includes a generally rectangular housing 11 having a food product inlet 12 and a food product outlet 13. All of the internal surfaces of electroheating cell 10 and housing 11 are composed of, or coated with, an electrically insulating non-metallic material 14 such as, for example, porcelain, plastic, glass or ceramic. It is important that the food not come in direct contact with any metal surface in electroheating cell 10.

Figure 9:
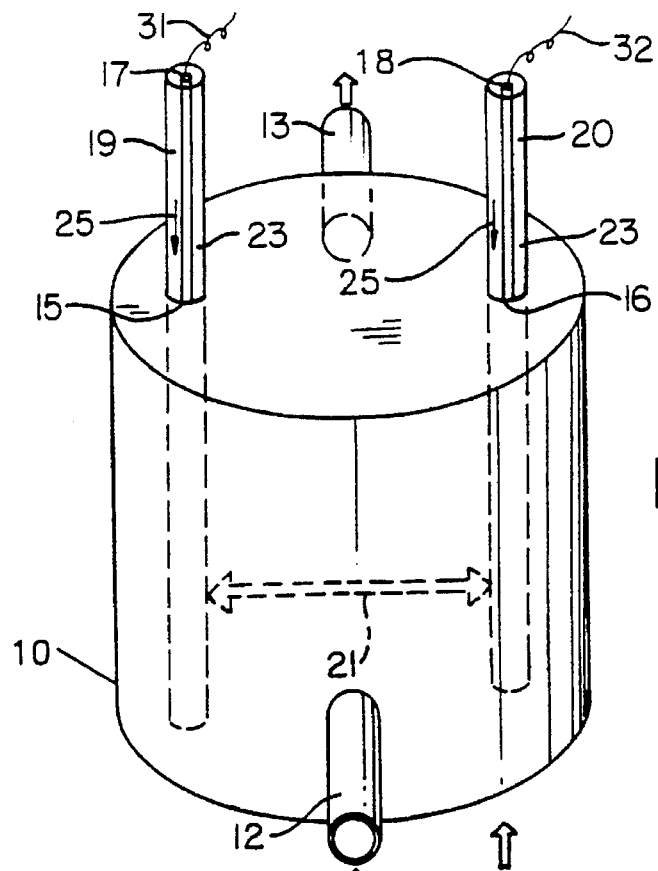
FIG. 9 is a side elevational view of an alternate configuration of an electroheating cell in accordance with the present invention.

Housing 11 also includes at least a first aperture 15 and a second aperture 16 through which electrode assemblies may be inserted into the interior of electroheating cell 10. The term "electrode assembly(ies)" will be defined in greater detail herein. However, briefly, an electrode assembly includes an electrode, a barrier which prevents food from directly contacting the electrode and an electrolyte-filled gap disposed therebetween. Generally, apertures 15 and 16 are disposed in the same wall of housing 11 as shown in FIGS. 1 and 9. Of course, they need not be so disposed and other arrangements are contemplated. A first electrode assembly including electrode 17 is inserted into the interior of electroheating cell 10 through first aperture 15 and a second electrode assembly including electrode 18 is inserted into the interior of electroheating cell 10 through second aperture 16. The location of apertures 15 and 16 is not important so long as they are spaced relative to one another such that a suitably sized heating zone 21, as to be described herein, is formed between the electrodes in housing A plurality of pairs of electrode assemblies can be placed into a single electroheating cell 10, or several cells 10 utilizing one or more pairs of electrode assemblies can be formed.

It is also contemplated that electroheating cell 10 can have any cross-sectional shape such as a generally round, square, oval, etc., i.e. a hollow pipe or cylinder. See, for example, the electric cell 10 of FIG. 6.

Again, as illustrated in FIG. 1, first aperture 15 and second aperture 16 are provided to allow for the respective insertion of the first electrode 17 and second electrode 18, along with their associated assemblies as described herein into the interior of electroheating cell 10. The electrode assemblies 17 and 18 are mounted within a respective aperture 15, such that a liquid, air, and bacteria proof seal is formed.

First electrode 17 and second electrode 18 are preferably open ended hollow cylindrical tubes of conductive metals which are not intended to come into direct intimate contact with the food product. To accomplish this objective, a pair of hollow cylindrical test tube like barriers 19 and 20 having a closed generally hemispheric bottom are provided which, as illustrated in FIGS. 1 and 2, substantially completely envelope the electrodes. The distance between the first barrier 19 and the second barrier 20 is referred to as the food product heating zone 21. It is in this general area that most of the electroheating takes place in electroheating cell 10. When the electrodes 17 and and their related structure, as illustrated in FIG. 1, are used in a single pair, it is best to locate them so as to maximize heating zone 21 and minimize the distance between the surrounding barriers 19 and 20 and the adjacent walls of the housing 11. This minimizes the "dead space" through which the food product can travel without being subject to the heating zone 21. Alternatively, a wall or blockage could be constructed to divert the flow directly into heating zone 21.

Figure 5:
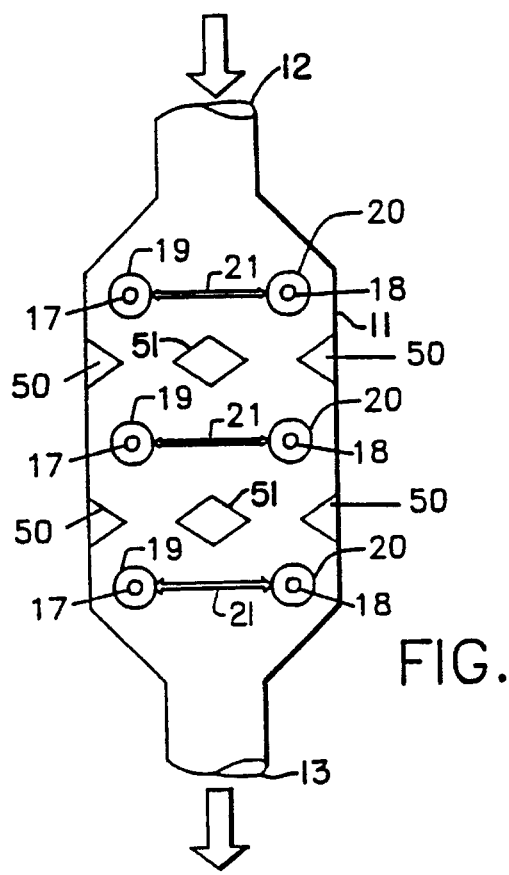
FIG. 5 is a top plan view, in cross section, of an electroheating cell including a plurality of electrode pairs and a plurality of flow diverters.

As shown in FIG. 5, it is also possible to use a plurality of pairs of electrodes. In such cases, flow diverters 50 and 51 can be positioned throughout the housing to ensure that all of the food product being treated flows through at least one heating zone 21 formed between at least one pair of electrodes. Preferably, the food product will be diverted into a plurality of such heating zones 21. Of course, if plate electrodes and plate shaped barriers are used, there will be no need for either walls or diverters 50, 51.

The exterior surface of electrodes 17 and 18 and the interior surface of the barriers 19 and 20, respectively, are maintained separated from one another to prevent their intimate contact by an annular separation gap 23 and 24 therebetween, each containing an electrolyte solution 25. In the embodiment illustrated in FIGS. 1 and 2, electrodes 17 and 18 are maintained at a substantially constant defined distance from the barriers 19 and 20 by mounting the electrodes in respective first and second plugs 33 and 34. The plugs 33 and 34 are inserted into the top opening of the generally test tube shaped barriers 19 and 20 so as to form a closed system. In this regard, the plugs 33 and 34 are secured within the apertures 15 and 16 and within the open end of the generally test-tube shaped barriers 19 and 20 such that the previously noted seal is provided. The plugs 33 and 34 are generally made of a heat resistant plastic such as nylon. Of course, other non-conductive materials may also be used.

The plugs 33 and 34 have respective electrolyte inlets 27 and 28 through which electrolyte solution 25 is introduced into the interior of each electrode 17 and 18 and its associated structure. The flow of electrolyte solution 25 through the electrode assembly is illustrated by the arrows. Specifically, electrolyte solution 25 flows into the interior of electrodes 17 and 18 through respective electrolyte inlet 27 and 28. Electrolyte solution 25 then flows through the entire length of the electrodes 17 and 18 where it exits at the open end 26 and 26' thereof. Thereafter, electrolyte solution 25 flows back along the outer surface of electrodes 17 and 18 filling the annular separation gaps 23 and 24. Plugs 33 and 34 are designed to each accommodate at least one electrolyte outlet, such as respective electrolyte outlets 29 and 30. Electrolyte solution 25 exiting through one of the electrolyte outlets 29 and 30 can be processed to remove the products of electrolysis and also to cool the electrolyte solution before it is returned to a reservoir 60 for re-introduction through the electrolyte inlets 27 or 28. As shown in FIG. 1, this can be accomplished by use of circulating pump 62, and a cooling unit 61 as is conventional. Of course, the cooling and removal of products of electrolysis can also take place just prior to reintroducing the electrolyte to an electrode. In addition, the electrolyte exiting through an electrolyte outlet in one electrode can be reintroduced into one or more successive electrodes before being recycled.

The electrolyte inlets are often made of a conductive material in electrical connection with the electrodes. The electrolyte inlets in such cases may serve as the point of connection to the source of electrical energy. See, for example, FIG. 1 wherein electrodes 17 and 18 are connected to a source of alternating electrical energy (not shown). This is accomplished through respective power cable and coupling means 31 and 32 attached to electrolyte inlets 27 and 28 respectively.

To ensure equal exposure of food product in electroheating cell 10 to the current passing between electrodes 17 and 18, i.e. crossing through heating zone 21, the generally rounded closed end portions of the barriers 19 and 20 may be disposed in a respective recess 35 and 36 provided in the bottom wall of the housing 11. These recesses 35 and 36 support the lower end of the electrodes and their associated barriers.

It should be understood that the exact structure of electroheating cell 10 need not be as just described. This structure and arrangement is illustrated as one embodiment of the present invention. It is only required that at least one pair of electrodes 17 and 18 be provided and that each electrode be protected from intimate contact with the food product being treated by a highly conductive barrier. The shape of the electrodes 17 and 18 is also not essential to the present invention. For example, electrodes may be flat plate electrodes, solid rods, round or other cross section, or could have a coiled shape.

Figure 7:
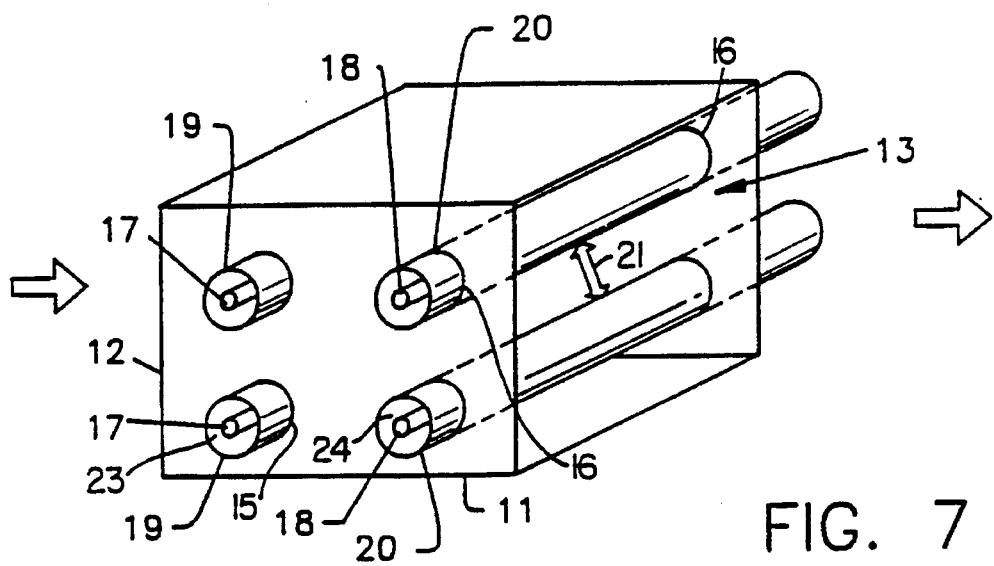
FIG. 7 is a side elevational view, in partial perspective, of an alternate configuration of an electroheating cell utilizing a solid rod electrode and a hollow tube shaped barrier open at both ends.

As illustrated in FIG. 7, barriers 19 and 20 can be completely cylindrical having two open ends, the cylinder bridging across the interior of the housing 11. A rod shaped electrode having a solid cross-section can then be inserted into the interior of the cylindrical barriers through one of the circular open ends and spaced apart therefrom. Electrolyte solution 25 can traverse the housing through the gap created between the electrodes 17 and 18 and the barriers 19 and 20 respectively by entering through one of the open ends of the cylindrical barrier and exiting out of the other on the other side of housing 11.

Figure 8:
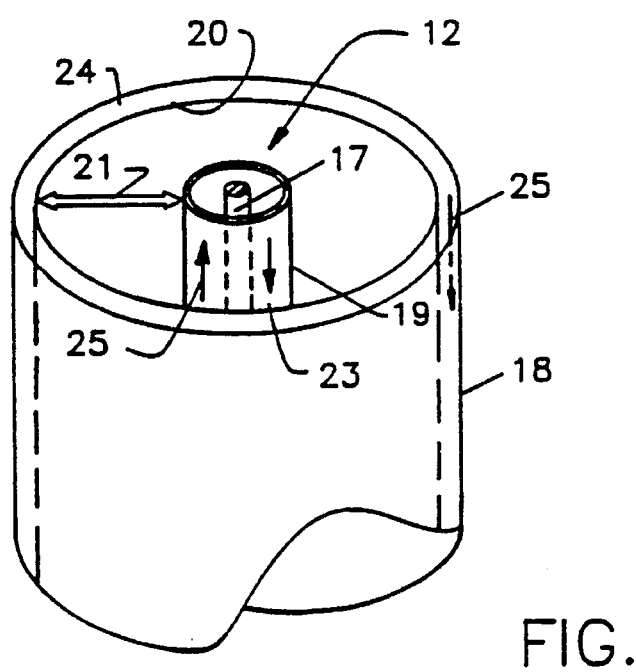
FIG. 8 is an end view, in partial perspective of an alternate configuration of an electroheating cell including both concentric electrodes and concentric barriers.

In another embodiment in accordance with the present invention illustrated in FIG. 8, there is provided concentric cell including concentric electrodes and barriers. A solid rod shaped electrode 17 is used having a concentric barrier 19. The electrode 17 and barrier 19 are separated from one another by a gap 23 into which electrolyte solution 25 flows. A second electrode 18 is provided in the form of a hollow cylinder. The electrode 18 has a diameter which is sufficiently large to allow electrode 17 and concentric barrier 19 to be inserted into the interior thereof, without contact. A second barrier 20, also in the form of a hollow cylinder, is disposed within the interior of electrode 18 such that it does not contact the second electrode 18 or the first barrier 19. A gap 24 is provided between second electrode 18 and second barrier 20 into which electrolyte solution 25 flows. The gap formed between barriers 19 and 20 is the heating zone 21 through which the food product to be heated or treated flows. Unlike other configurations illustrated in, for example, FIGS. 1, 5, 6, 7, 9 and 10, the electrodes themselves form both the electroheating cell 10 and the housing 11. Of course, the electrodes in FIG. 8 can be, and preferably would be, housed in a separate housing.

Figure 6:
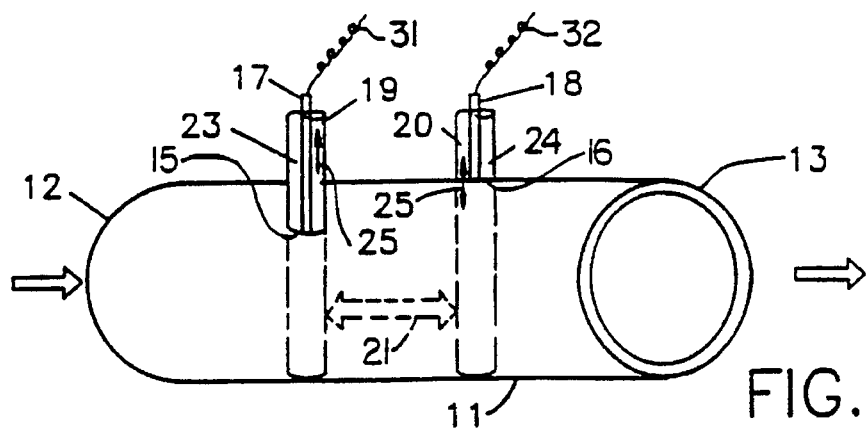
FIG. 6 is a side elevational view, in partial perspective of an alternate configuration of an electroheating cell having a circular cross-section.

As shown in FIG. 9, it is also possible to arrange electrodes 17 and 18 and their respective structure in the end of a cylinder rather than in the side wall of a cylinder as shown in FIG. 6.

Figure 10:
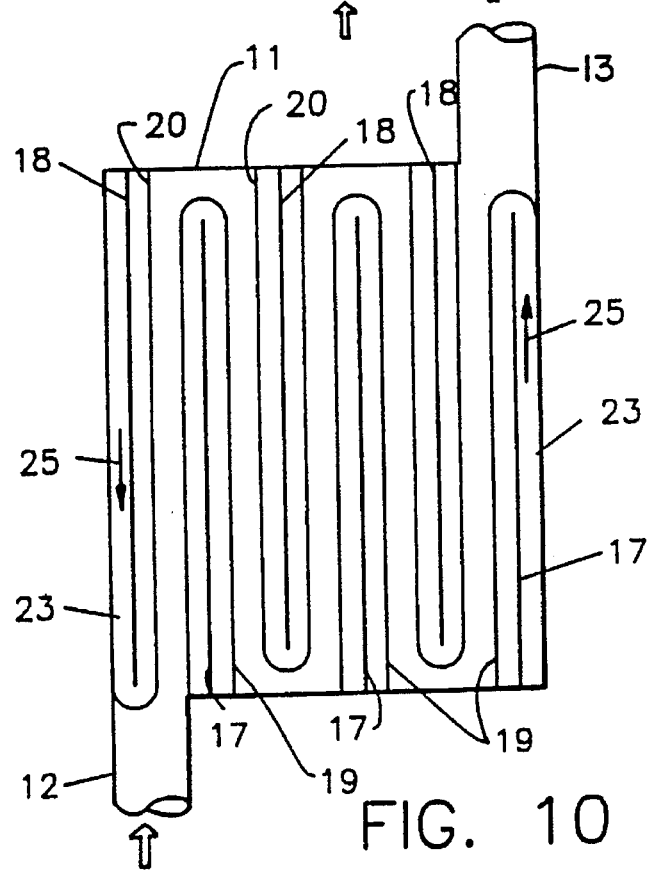
FIG. 10 is a side elevational view, in cross section, of an electroheating cell utilizing flat plate electrodes and a barrier having a substantially U-shaped cross section.
Figure 11:
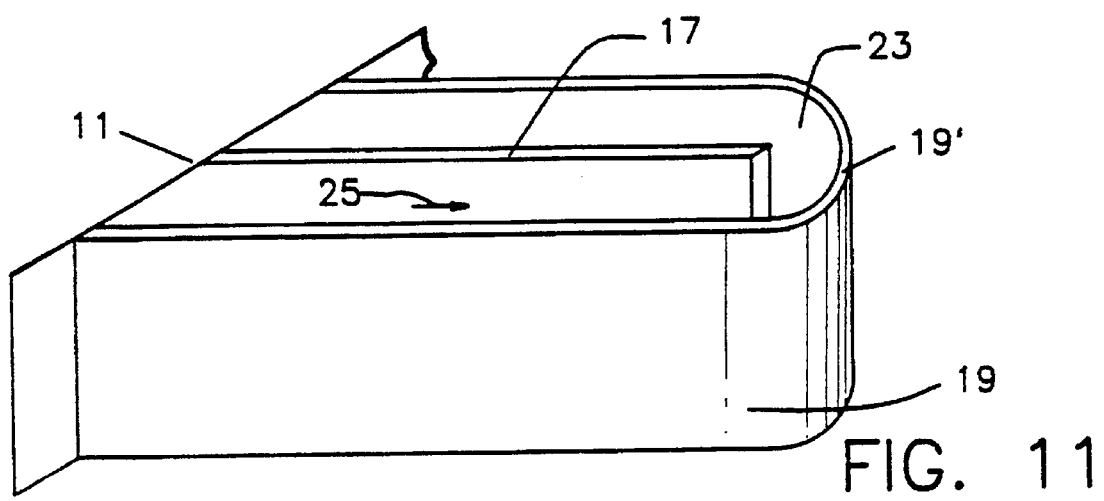
FIG. 11 is a partial perspective side view of an electrode and associated barrier as illustrated in FIG. 10.

Barriers can be cylindrical, as shown in FIGS. 8 and 9, or can be flat. Flat barriers can be produced as will be described by attaching a plurality of cylinders or other shaped barriers together. Alternatively, a single sheet of material can be used. However, sheets as used herein are not necessarily flat. As shown in FIGS. 10 and 11, sheets of, for example, ceramic material can be formed into sheets which include a fold or rounded portion. In the embodiment shown in FIGS. 10 and 11, the electrode 17 is a flat sheet. The barrier is also a sheet which is folded in half having a U-shape so as to provide a gradual, rounded bend 19'. Electrolyte can be introduced on one side of the electrode and removed on the other side. To accomplish this, the barrier must extend from the top to the bottom of the electroheating cell 10 and be attached thereto. This would totally enclose the electrode.

As previously noted, at least one pair of electrodes 17 and 18 must be provided. Successive opposed pairs of electrodes having the same or different configuration can also be used. See, for example, FIGS. 5, 10 and 13.

The electrodes 17 and 18 can be manufactured from a variety of conductive metals such as steel or copper. Preferably, the electrodes 17 and 18 are manufactured from materials which will not dissolve because of electrolysis. At certain frequencies such as, for example, household or mains frequency, 60 Hz in the U.S.A. and 50 Hz in Europe, the problem of electrolysis is particularly acute. Metals, such as gold, carbon, platinum, and titanium alloys do not dissolve under such conditions. It is therefore possible to create electrodes 17 and 18 entirely from these materials to avoid this problem. It is noted that titanium may slowly corrode. However, it forms insoluble titanium oxide which can be filtered as described.

Alternatively, the electrodes 17 and 18 can be made from, for example, a core of a highly conductive metal such as copper. The core is then coated with a stable rare metal such as platinum, gold or titanium. A coating of from between about 10 to about 50 microns in thickness is adequate.

As previously discussed, the use of stable rare metals as the electrodes 17 and 18 will reduce or eliminate the electrolysis based dissolution of the electrodes. Nonetheless, at frequencies of under 100 kHz and, more particularly, under 100 Hz, the process of electrolysis can still cause the creation of hydrogen, chlorine, and oxygen. These elements, in their atomic forms, are very active as reducers and oxidizers. These species, and otherwise reactive species, persist even if electrodes 17 and 18 are made of, for example, gold. To ensure that these reactive species do not adversely affect the food product being electroheated, the barriers 19 and 20 are provided containing the electrolyte solution 25 so that this form of electrolysis can take place in the electrolyte solution 25 instead of within the food product. If a dissolvable metal electrode is used, then the electrolyte solution 25 receives the dissolving metal and the barriers 19 and 20 ensure that neither the dissolved metal species nor the gases or other species generated can affect the treated food product. Similarly, it is very important to ensure that the food being treated is not placed in direct contact with any metal surface within electroheating cell 10. Even if dissolution of the cell itself could be avoided by use of precious metals such as gold, there still remains the need to avoid the other adverse consequences of electrolysis. This is accomplished by coating cell 10 or alternatively constructing cell 10 from inert, insoluble, non-conductive materials such as porcelain, ceramic, glass and the like.

The barriers 19 and 20 can be made of a variety of materials. However, a number of variables must be considered in the material selection. First, the barriers 19 and 20 must have a high capacity for the electrolyte solution 25 such that they can have a very high conductivity/low resistivity. Absent the electrolyte solution, the material used to construct the barriers 19 and 20 is generally insulative. Preferably, the conductivity of the barriers 19 and 20 including the electrolyte solution will be identical to that of the electrolyte solution per se.

Second, the barriers 19 and 20 must promote a high degree of conductive stability by retaining the electrolyte solution. If the electrolyte solution is not retained, then, at least in localized areas, the resistivity of the barriers 19 and 20 will increase and the efficiency of the electrical transfer will decrease. More importantly, however, the increase in resistance is generally accompanied by an increase in conversion of electric current to heat. As the barriers 19 and 20 heat up in localized areas, the barriers may dry out and the cycle of lower efficiency and increased conversion of energy to heat accelerates. Conductive stability can be achieved by the use of thin barrier walls which minimize the chance of any portion of the barriers 19 and 20 drying out.

In addition, the conductive stability of the barriers 19 and 20 can be further improved by dissipating heat which may be built up within the system. In particular, the outer surface of the barriers tend to get hot because of their contact with the heated food. In accordance with the present invention, heat dissipation is preferably achieved by recirculating and cooling the electrolyte solution by conventional pumping and cooling devices as previously described.

The barriers 19 and 20 should also have sufficient porosity to ensure that there is a flow of electrolyte solution into the barriers. This will help ensure that the barriers 19 and 20 remain fully wetted and assist in heat dissipation.

The barriers 19 and 20 should have a high degree of mechanical stability. For example, the barriers 19 and 20 are to withstand a pressure differential. In accordance with one embodiment of the present invention, the electrolyte solution is maintained under a higher positive pressure than that of the food product being treated. This ensures that the electrolyte solution has good penetration into the barriers 19 and 20 while, at the same time, discouraging the impregnation of the barriers with the food product being treated. The impregnation of the barriers 19 and 20 with the food product may increase the localized resistance of the barriers 19 and 20, thereby increasing the conversion of energy to heat and promote the drying out of the barriers. Positive pressure reduces these problems, but creates its own physical stress. Thus, the barriers should be able to withstand both the increased pressures applied and the pressure gradient formed across the barrier. The barriers should also be able to withstand long term elevated temperatures, a temperature differential across the barrier, and prolonged passage of continuous electrical energy therethrough.

The material used for the barriers 19 and 20 should be inert and insoluble in both the food product and the electrolyte solution. The barriers 19 and 20 also should not include metal or other electron conducting components as these components may be subject to electrolysis when placed in the electric field emanating between the electrodes 17 and 18.

More specifically, the barriers 19 and 20 requires having the correct porosity. The barrier must be porous enough to allow sufficient electrolyte solution in, without being porous enough to allow for significant leakage of electrolyte solution into the food product or the penetration of the barriers by the food product being treated. Generally, the porosity of the barrier material is maintained somewhat lower than would otherwise be selected because of the use of positive pressure acting upon the electrolyte solution. This aids the forced permeation of the barriers 19 and 20 with electrolyte solution and, at the same time, resists the seepage of electrolyte solution into the food product and the permeation of the barriers by the food product being treated. Suitable ceramic material for the contraction of the barriers 19 and 20 can be obtained from Coors Ceramic Company.

Ceramic manufacturers use a number of standards to measure porosity. These standards are not always comparable and variability in ceramic porosity is an industry wide problem. Therefore, in the context of the present invention, porosity should be practically defined in terms of the number of cc's of water which can pass through 1 $cm^2$ of a ceramic barrier material in one hour with a 1 p.s.i. pressure differential across the material. The porosity of the barrier should be selected to insure that undesirable levels of leakage of the electrolyte solution into the food being treated is avoided. In some instances, this will mean minimizing the porosity of the barrier material. However, for other products such as those to which salt will intentionally be added, the porosity of the barrier material can be selected to deliver the necessary amount of salt to the product. Generally, the minimum porosity should be about $5.0 \times 10^{-2}$ cc's per $cm^2$ per hour per 1 p.s.i. The maximum porosity should be about 5.0 cc's per $cm^2$ per hour per 1 p.s.i. For most circumstances, a porosity of about 0.3 cc's per $cm^2$ per hour per 1 p.s.i. has been found to be useful.

In general, the thickness of the barriers 19 and 20 should be about 1/8" or less and preferably, about 1/16". When certain ceramic barriers of 1/4" thickness were used, particularly when the barrier is in the form of a flat plate, drying out of the barrier occurred. On the other hand, if a barrier thickness of 1/16" or less is used (i.e. 1/32") it may be necessary that the barriers 19 and 20 be structurally reinforced, particularly if the barriers are constructed in the form of a flat sheet.

Figure 4:
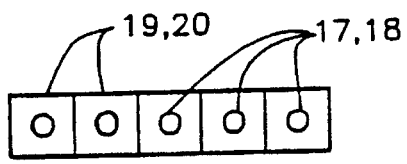
FIG. 4 is a top plan view of another embodiment of an electrode assembly including a plurality of electrodes contained within the barriers.

It has been found that additional strength and dimensional stability can be provided by the use of barriers 19 and 20 which are cylindrical or test tube in shape as illustrated in FIGS. 1 and 2. The additional stability and strength of such structure allows for the use of generally thinner barriers. It is also contemplated, however, to cement a plurality of such barriers 19 and 20 together in side by side relationship as illustrated in FIGS. 3 and 4. When using cylindrical barriers, the resulting serrated profile can then be rendered flat and smooth on one or more sides by the exterior application thereto of a coating layer 81 of additional porous ceramic as shown in FIG. 3. Electrodes 17, 18 can be disposed behind this composite barrier structure as illustrated in FIG. 3A or can be disposed in the center of one or more of the cylindrical barriers 19, 20 as illustrated in FIG. 3B. The arrow 25 in FIG. 3A represents the flow of electrolyte between the electrode surface and the barrier. Hollow square, rectangular, triangular and other shaped barriers can also be used and can be cemented together in like fashion. A rectangular barrier of this structure is illustrated in FIG. 4.

While porous ceramic material is preferred in accordance with the present invention, other porous materials may also be used such as porous glass, cloth, such as used in the construction of fire hoses, and the like.

As previously described, the electrodes and the barriers are separated by a gap 23 which can be of any size. However, the larger the gap, the greater the overall resistance of the electrode system. It is desirable to keep the resistivity of the electrolyte solution and barrier combination, and in fact the electrode itself to as little as possible. This will minimize the heat loss to the electrolyte and maximize the energy transferred to the food product. Preferably, the combination of the barrier and electrolyte solution contribute 5% or less to the total resistivity of the electrode system in operation. Put another way, the combined resistance of the electrolyte solution and barrier should be 5% or less of the total resistance of the combination of the electrolyte solution, the barrier and the food product being treated. Most preferably, the resistance of the electrolyte solution and barrier is 1% or less of the total resistance of the electrode system. Therefore, the gap between the barrier and the electrode is generally minimal and is preferably the same as the thickness as the barrier itself.

Any electrolyte solution which is biocompatible and which, in rather large amounts (1000 ppm or less) does not significantly effect the organoleptic qualities of the food product being treated can be used in accordance with the present invention. For example, sodium chloride may be used. The concentration of the electrolyte solution depends on the particular electrolyte solution used.

It is known that the conductivity of an electrolyte solution may increase and/or decrease as a function of concentration. As concentration of the electrolyte solution increases, so too does the conductivity, up to a point. Thereafter, increases in concentration may actually decrease the conductivity. Preferably, the concentration which will provide maximum conductivity for a given electrolyte solution is used. Potassium chloride is particularly useful in accordance with the present invention because a 30% solution can be used with maximum conductivity profiles. This high concentration ensures high conductivity. In addition, potassium chloride is particularly desirable since both the potassium and chloride ions have approximately the same electrical transfer rate. This ensures that the number of positive and negative ions available at any one time stays roughly constant and roughly equal. Sodium chloride may also be used, however, its maximum conductivity is not as high as that of potassium chloride. Solutions of calcium chloride, potassium sulfate, sodium sulfate and other conventional electrolytes may also be used.

Figure 13:
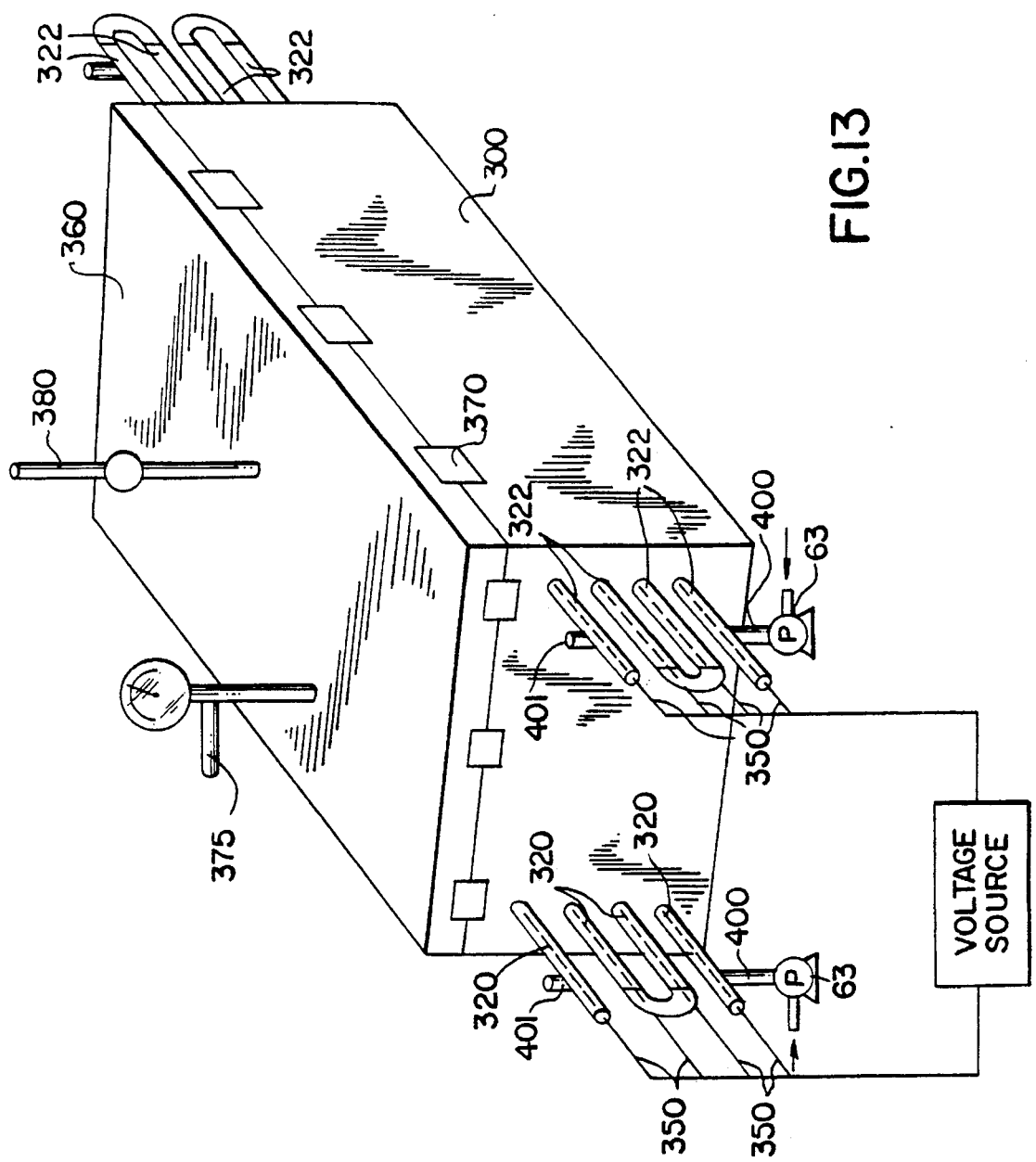
FIG. 13 is a schematic perspective diagrammatic illustration of an electroheating apparatus including a plurality of electrode assemblies used for electroheating the food products pursuant to Examples 1–7.

As previously described, it may be advantageous to maintain the electrolyte under positive pressure. This can be accomplished by use of a positive pressure pump 63, as shown in FIG. 13, used to recirculate the electrolyte solution. The electrolyte is also preferably maintained at a temperature which is below the temperature of the food being treated. Therefore, preferably, the electrolyte is cooled to a temperature of between about 1° C. and about 10° C. below the temperature of the food being treated.

Potassium chloride is particularly bitter tasting. However, with a barrier of ceramic having a porosity equivalent to seepage of $5.0 \times 10^{-2}$ cc's per $cm^2$ per one hour per one atmosphere, only about three parts per million of the electrolyte traverses the barrier and enters the liquid food product. This is based on a food product flow rate of 25,000 lbs./hr. It may also be advantageous to add a gelling agent to the electrolyte solution. The formation of a weak gel will further retard the seepage of electrolyte into the food product. For example, 0.1% to 0.5% weight of alginate will form a gel which is high enough in viscosity to assist as a seepage retardant. However, the resulting electrolyte is not so viscous that it cannot "wet" the barrier or be pumped.

As the electroheating cell 10 is utilized, some of the electrolyte solution will be depleted either through seepage into the food product being treated or electrolytic decomposition of water. It is important that the various electrolyte levels be monitored and their levels adjusted by the addition of additional electrolyte as needed. In addition, it is necessary that the gases formed within the electrolyte solution be vented and removed from the electrolyte solution.

The energy utilized in accordance with the present invention is alternating current. The alternating current has a continuous sinusoidal wave form and, most preferably, includes both a positive and a negative component. Preferably, the waves are symmetrical and have an equal positive and negative component. The frequency of the electrical energy used can range from about 30 Hz up to about 99 kHz, but is more preferably between about 50 Hz and about 10 kHz, particularly in the United States. Most preferably, the frequency ranges from between about 50 Hz and about 99 Hz.

In addition, it is preferred that the voltage utilized in accordance with the present invention range from between about 50 to about 500 volts and that the current range from between about 50 to about 500 amps. Preferably, the current should be limited to about 300 amps. This can be accomplished by adjusting the size of heating zone 21 between the pairs of barriers 19 and 20 and by controlling the voltage. Of course, these are the total currents. Typical current densities are generally lower than about 4 amps/$cm^2$ and more preferably, about 1 amp/$cm^2$ or less.

Electroheating cell 10 is a radical departure from devices known in the art. Not only is the cell 10 able to effectively produce heat treated food product without contamination from electrolysis, and not only can it eliminate the problem of dissolving metal and the generation of gases and oxidizers within the food product being treated, but it can also accomplish these results without the use of high voltage, high current equipment, in an efficient and cost effective manner. The aforementioned '140 patent requires the use of high frequency energy. This successfully eliminated the problems of electrolysis. However, the power requirements for such sources of electrical energy are costly and sometimes difficult to work with. Similarly, the present invention represents a significant advance over the devices disclosed in the aforementioned '472 patent in that electroheating can be accomplished without resort to extremely high voltage, high current, and high current density electric pulses.

The electroheating cell 10 as thus far described can be utilized to electroheat all sorts of foodstuffs. These include tomatoes, whether in diced, whole or in paste form, vegetables in general, avocado, whether whole or in paste form, meats, fish, poultry, eggs, egg shells (used as an animal food supplement), milk, fruit juice, vegetable juice, jams, jellies, puddings, cheese, yogurt, mushrooms (i.e. to sterilize without loss of weight or volume), whole beets (so as to minimize leaching), Mexican salsa including high concentrations of vegetable particulate, soups, sauces, seafood such as shrimp, waste from the meat and poultry industry for use as animal feed, dog food, cat food, and the like.

Electroheating cell 10 in accordance with the present invention can be used in a number of applications. First, electroheating cell 10 can be used to merely heat liquid food products to a predetermined temperature. Electroheating allows for very rapid and accurate heating which can be particularly useful in heating any conductive food product such as water, hot drinks, warm cereal, soup, stew, gravy, spaghetti sauce, cheese sauce and the like. By using a plurality of electroheating cells 10 linked in succession, (or a single cell 10 including a plurality of paired electrode assemblies as shown in FIG. 5), such that food product flows past each set of electrodes one after the other, it is possible to elevate the temperature of food product through relatively wide ranges of temperature. For example, temperatures ranging from between about 40° F. to about 600° F. may be attained. Of course, these temperatures are under suitable levels of pressure. When operating at higher pressures, it may also be necessary to apply a greater level of pressure to the electrolyte. This will assist in maintaining an advantageous level of pressure on both sides of the barrier.

While it is possible to electroheat through this entire range of temperatures, electroheating need not be the only heating technology employed. Electroheating may also be used in combination with any other conventional heating technique or apparatus such as, for example, ovens, vats, plate heat exchangers, microwaves, tubular heat exchangers, steam heating systems and the like.

The electroheating cell 10 in accordance with the present invention may also be used to pasteurize food products so as to render the food product safe to consume for at least a finite period of time. There are a great number of possible definitions for "pasteurization". Often, the definition depends on the types of microorganisms being killed in a particular food product and such standards are generally set by governmental agencies. In the United States, the United States Food and Drug Administration and the United States Department of Agriculture set these standards. In that context, the terms "pasteurized" and "pasteurization" generally refer to heat treating a food product to a degree which is sufficient to comply with all governmental regulations regarding the use of these terms in connection with a particular food product.

Notwithstanding, most pasteurization techniques require that food products be treated by being heated to a certain temperature and maintained at that temperature for a time which is sufficient to kill at least a certain percentage of microorganisms and, in particular, pathogenic bacteria that may be contained therein. The act of pasteurizing food products by applying heat thereto and by maintaining the food product at the elevated temperature for a predetermined period of time may also kill microorganisms which are involved in the spoilage process.

It is not practical to discuss all of the possible pasteurization conditions, methods and apparatus which can make use of electroheating cell 10 nor would such a description be necessary as those of ordinary skill in the art clearly could integrate the present invention into their existing technology and processes. However, by way of illustration, and without limitation, the pasteurization of liquid egg will now be described.

"Pasteurization" in general terms refers to the killing of sufficient pathogenic microorganisms so as to render the food product edible without threat of bacterial infection. Pasteurization may also be thought of as a treatment which is designed to eliminate, for all practical purposes, pathogenic microorganisms and, secondarily, to reduce the number of spoilage microorganisms present to improve the keeping qualities of the food products. For example, and with reference to liquid whole egg products, at U.S.D.A. minimum time and temperature parameters (140° F. and a 3.5 minute holding time for liquid whole egg), pasteurization will generally produce liquid whole egg which will have a refrigerated shelf life of between about 7 and about 14 days.

Figure 12:
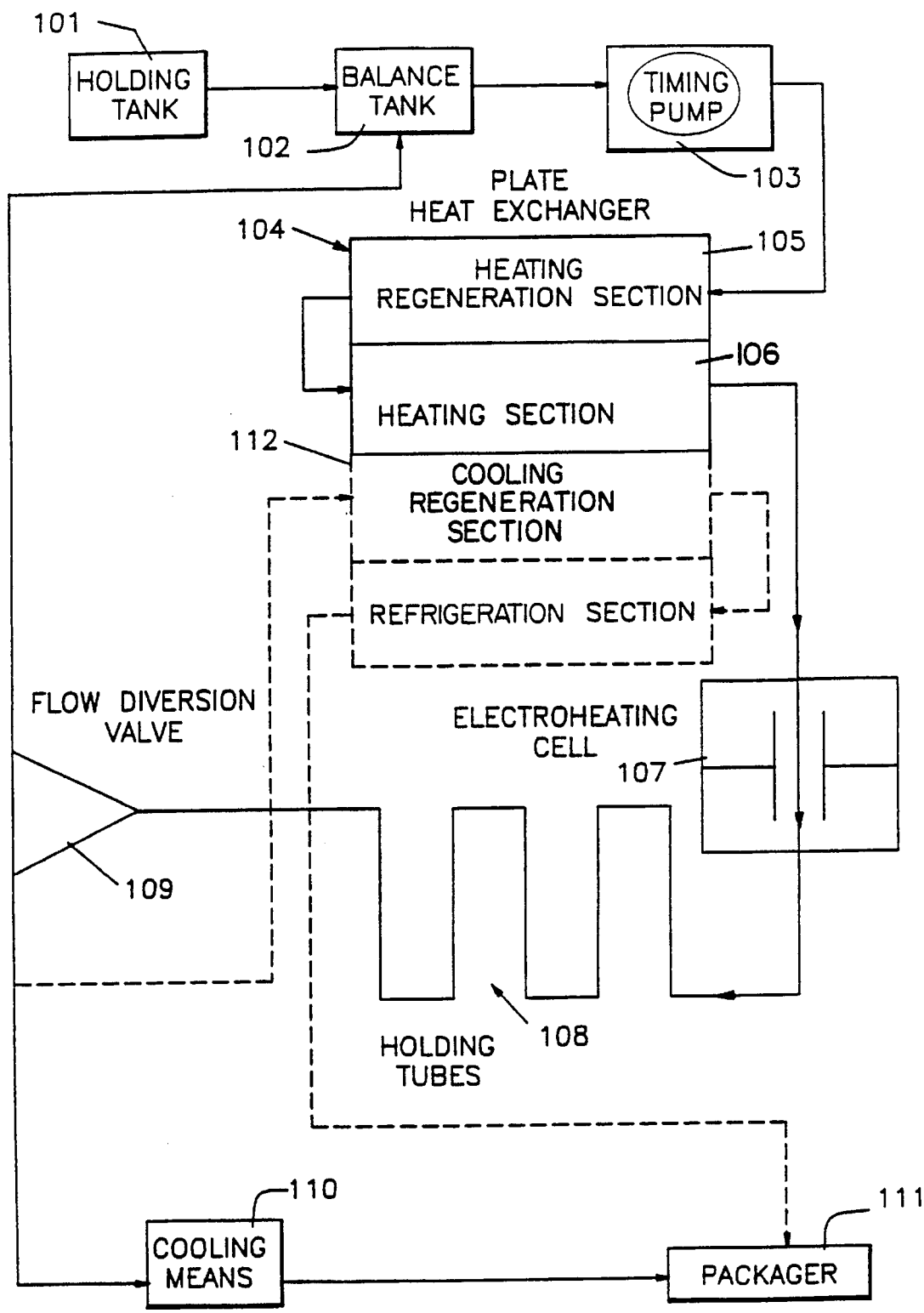
FIG. 12 is a schematic diagram of a typical pasteurization device which can be utilized in connection with the electroheating cells of the present invention.

Pasteurization methods in accordance with the present invention can be accomplished using only a conventional pasteurizing line where the principle heating source is replaced with or supplemented with an electroheating cell as described herein. For example, and with reference to the pasteurization of liquid egg products, pasteurization can be accomplished using the basic apparatus described in U.S. patent application Ser. No. 07/862,198, filed Apr. 2, 1992, entitled, "Methods and Apparatus of Electroheating Liquid Egg" and U.S. patent application Ser. No. 08/007,555, filed Jan. 22, 1993, entitled, "Producing Extended Refrigerated Shelf Life Food Without High Temperature Heating", the texts of which are incorporated herein by reference. The electroheating cells in accordance with the present invention can be substituted for the high frequency electroheaters described therein. In general terms, however, the use of the present invention for pasteurization will be better understood with reference to FIG. 12 which is a schematic diagram of a liquid egg pasteurizer.

Food products to be treated are transferred from holding tank 101, usually a refrigerated holding tank, to balance tank 102. Thereafter, the food is pumped through a timing pump 103 which keeps the food moving throughout the entire pasteurization apparatus. The food, may then, in one option, be preheated. Any conventional means of heating can be utilized to preheat the food such as those previously discussed. In addition, electroheating cells 107 can be used to preheat the food from the refrigerated or room temperature to pasteurization temperature. For example, a conventional plate heat exchanger 104 can be used. Food traveling from timing pump 103 is introduced into plate heat exchanger 104 and specifically into the regeneration (preheating) section 105 thereof. After passing through the regeneration section 105, the temperature of the food is elevated from, for example, its refrigerated temperature. Thereafter, the food is introduced into heating section 106 of plate heat exchanger 104 where the temperature is further elevated.

Thereafter, the food passes between the two barriers surrounding the two electrodes of electroheating cell 107. Electroheating cell 107 is constructed identically to that previously described, and preferably, contains a plurality of pairs of electrodes as also previously described. In electroheating cell 107, alternating electrical energy having a frequency of between about 50 Hz and about 99 kHz is applied to the food so as to elevate its temperature to the intended pasteurization temperature. Pasteurization temperatures of over 170° F. and even as high as 210° F. may be obtained in accordance with the present invention.

After being electroheated, the heated food may be introduced into a means for holding food 108 at a predetermined temperature for a predetermined time. Preferably, the food flows from electroheating cell 107 into and through a series of holding tubes 108. These holding tubes 108 are insulated pipes having a predetermined length. The holding tubes 108 make it possible to maintain the electroheated food at pasteurization temperature for as long as the food flows therethrough.

After the food has worked its way through holding tubes 108, it reaches flow diversion valve 109. If the temperature of the food exiting holding tubes 108 is below a preset value, then it is presumed that pasteurization has not been completed and the food is channeled back to balance tank 102 through flow diversion valve 109. If, however, the temperature of the food is at or higher than the preset temperature, the food is allowed to proceed to a means for cooling 110 which is disposed to receive the food after exiting the means for holding tubes 108. Any cooling device may be used as means for cooling 110. These may include the use of conventional cooling/regeneration and refrigeration sections 112 (shown in dashed lines) of a plate heat exchanger (including, for example, plate heat exchanger 104) and/or other more sophisticated devices such as those described in the previously cited U.S. patent application Ser. No. 862,198, filed Apr. 2, 1992.

Thereafter, the pasteurized food may be held in a tank, transported to a tank car, or directly packaged using packager 111. Packager 111 may be any conventional packaging device or may be, and preferably is, a device capable of providing extended shelf life packaging. Extended shelf life packaging includes aseptic packaging and packaging utilizing, for example, so called "Clean Packs". Alternatively, the electroheated product may be packaged hot in which case, holding means and cooling means can be eliminated. Of course, cooling of the filled packs must be accomplished.

As shown in FIG. 13, a box-shaped device 300 was constructed in accordance with the present invention for electroheating food products using mains frequency. The box 300 was made of a clear plastic polycarbonate material of about ½ inch thickness. The outside dimensions of the box 300 were approximately 7 inches×6 inches×6 inches. Eight holes were drilled in two sets of four in each of two opposed side walls. Two sets of four ceramic tubes 320, 322 were then placed through opposed holes and a water tight, air tight seal was formed between the outer surface of the ceramic tubes and the inner surface of the holes in each of the opposed side walls. The ceramic tubes 320, 322 therefore traversed the entire inner cavity 340 of the polycarbonate box 300. The outside diameter of the ceramic tubes 320 was approximately 0.42 inches and the internal diameter was approximately 0.3 inches. The ceramic was approximately 0.06 inches thick. Inside of each tube 320, 322 a solid titanium rod 350 approximately 7 inches long was placed and set such that the rod 350 does not touch the inner walls of the ceramic tube. Each rod 350 was approximately ⅛ inch thick. Each set of four rods 350 was connected to one pole of a single phase source of electricity having a frequency of about 60 Hz and a voltage of about 220 volts. A Variac was introduced in the circuit so as to allow for the adjustment of the voltage between 0 and 240 volts.

Of course, different voltages may also be used. A cover 360 made of plastic polycarbonate material, a gasket made of silicone rubber (not shown), and fastening means 370 were also provided. The cover may include one or more valves such as pressure relief valve and pressure gauge 375 and one or more thermometers such as thermometer 380 which may be used for the introduction or removal of pressure, and/or observing internal pressure or temperature. For each of the following examples, an electrolyte of KCl (30% solution) was used as an electrolyte. The electrolyte was introduced between the titanium rod 350 and the ceramic tubes 320, 322 in each of the four tubes, such as via pump 63.

The electrolyte was introduced serially through feed tubes 400 into the interior of the electrode assemblies between the rod 350 and the ceramic tubes 320, 322 and the electrolyte was removed through conduit 401. About 35 amps of current were used in accordance with the present invention with the voltage starting at about 180 volts. Voltage was decreased down to as low as 80 volts as the product being heated got hotter. Generally, as the product being heated gets hotter, its resistance drops. To maintain constant current the voltage was therefore adjusted. On average, about 5 kilowatts of power was introduced to the product to produce a heating time of about 1.5 minutes while elevating the temperature by about 50° C. The electrode area was determined by the length and outside diameter of the ceramic barrier (6"×0.42" p×4 (the number of electrodes)×approximately ⅔. The ⅔ was a rough conversion representing the amount of the surface of the ceramic tubes 320, 322 actually responsible for heating. In this particular case, the effective area is about 21 sq. inches or approximately 136 $cm^2$. The current density was about 0.25 amps/$cm^2$. The capacity of the device described herein was approximately 2 kilograms of material.

The electroheating apparatus of FIG. 13 was used in each of the following examples.

EXAMPLE 1

Two kilograms of liquid egg was placed in the device described above at approximately 20° C. The lid was not used. After applying 35 amps (by regulating the voltage), for 1 ½ minutes, the temperature of the liquid egg reached 70° C.

EXAMPLE 2

Two kilograms of soup including shrimp, celery, mushroom and okra available from Bernard Foods, Lafayette, Louisiana were placed into the electroheating unit described above. The concentrated form was first introduced at 8° C. It was brought to boiling in about 2.5 to 3 minutes under the electrical conditions described in Example 1. A ready-to-eat formulation of the soup was also charged to the device previously described. The soup was brought to boiling in between 2.5 and 3 minutes. The shrimp remained supple and tender and the vegetables remained firm.

EXAMPLE 3

Two kilograms of plain pasteurized whole milk was introduced into the interior of the device provided above. The milk was between about 40° and 42° F. It was electroheated to a temperature of approximately 212° F. in about 2.5 minutes under the previously described conditions.

EXAMPLE 4

Approximately 2.5 kilograms of a soft cream like cheese available from Real Fresh Foods, Visalia, Calif. was introduced into the electroheater in accordance with the present invention described above. The cheese included small particles of vegetables like, for example, red pepper. The cheese was brought to boiling from room temperature in approximately 2.4 minutes.

EXAMPLE 5

Two kilograms of Nabisco brand salsa sold under the name Ortega, including diced tomato, onion, pepper and the like, was introduced into the device described above. The salsa was brought from room temperature to boiling in 2.4 minutes.

EXAMPLE 6

Chicken breasts and drum sticks, in water, were introduced into the interior of the device in accordance with the present invention. Approximately 250 grams of chicken was used. Sufficient water was introduced to fill the entire box. The well defrosted chicken was about 12° C. and the water was at about 22° C. A thermometer was stuck inside one of the breasts. The resistance of the chicken is lower than the resistance of the water so the chicken heated faster than the water. It took approximately 2 ½ minutes to get the water to boiling.

EXAMPLE 7

Salsa as described in Example 5 was introduced into the interior of the device described above. The gasket and cover assembly were used to seal the device. The salsa was heated as before. Heating continued for between approximately 2.5 and about 3 minutes. A vent in the cover was open until boiling (100° C.) was reached. Then the vent was closed and heating continued until a pressure of approximately 3 lbs. per square inch developed. This took only a few seconds. A temperature measurement was taken with a glass thermometer and the temperature of the salsa was 104° C.

The present invention may also be utilized to sterilize food products. Sterilization includes the destruction of substantially all microorganisms in the food product including those in a dormant or vegetative state. Sterilization, like pasteurization, involves the heating of a food product and maintaining the food product at a preselected temperature for a certain period of time. However, sterilization generally requires temperatures which are greatly in excess of those used for pasteurization.

Figure 14:
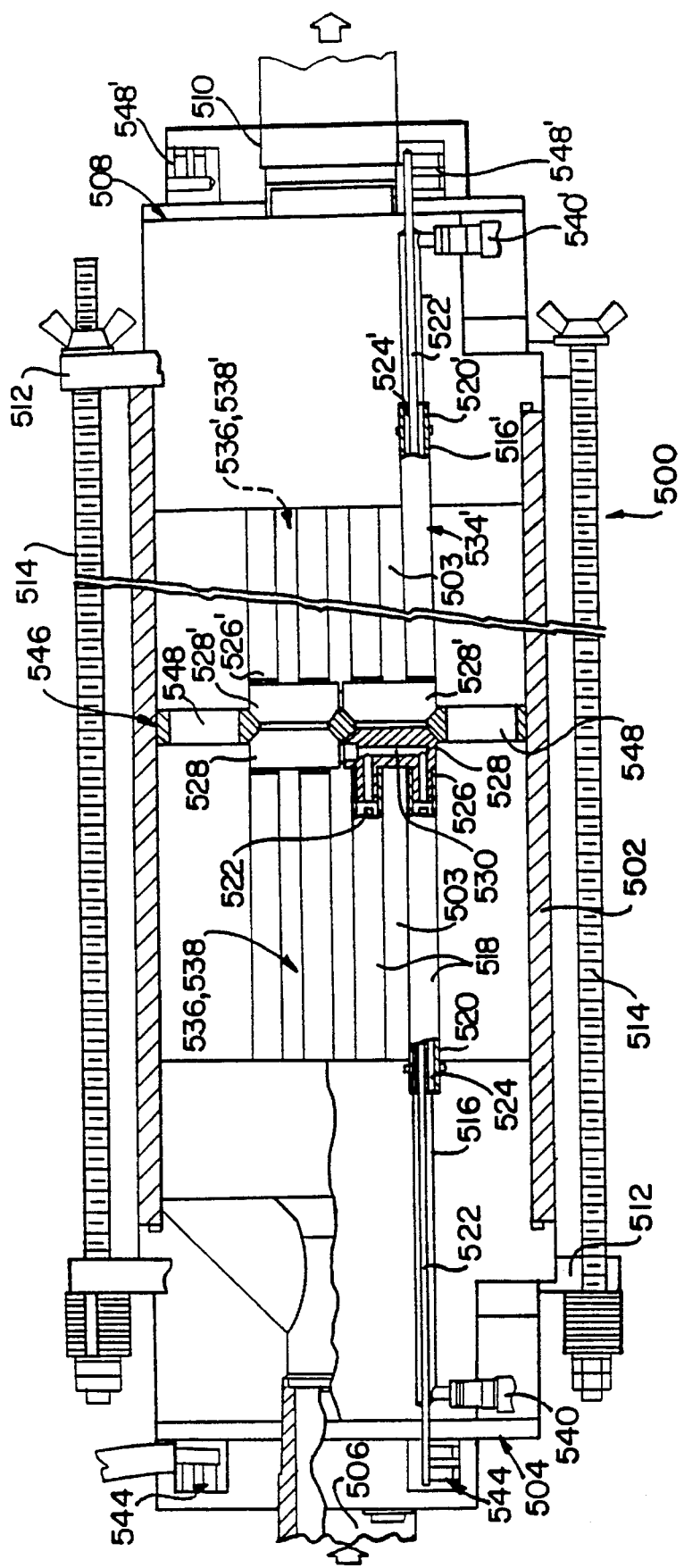
FIG. 14 is a side elevational view, in partial cross-section, of an electroheating apparatus including a plurality of electrode assemblies in accordance with the preferred embodiment of the present invention.
Figure 15:
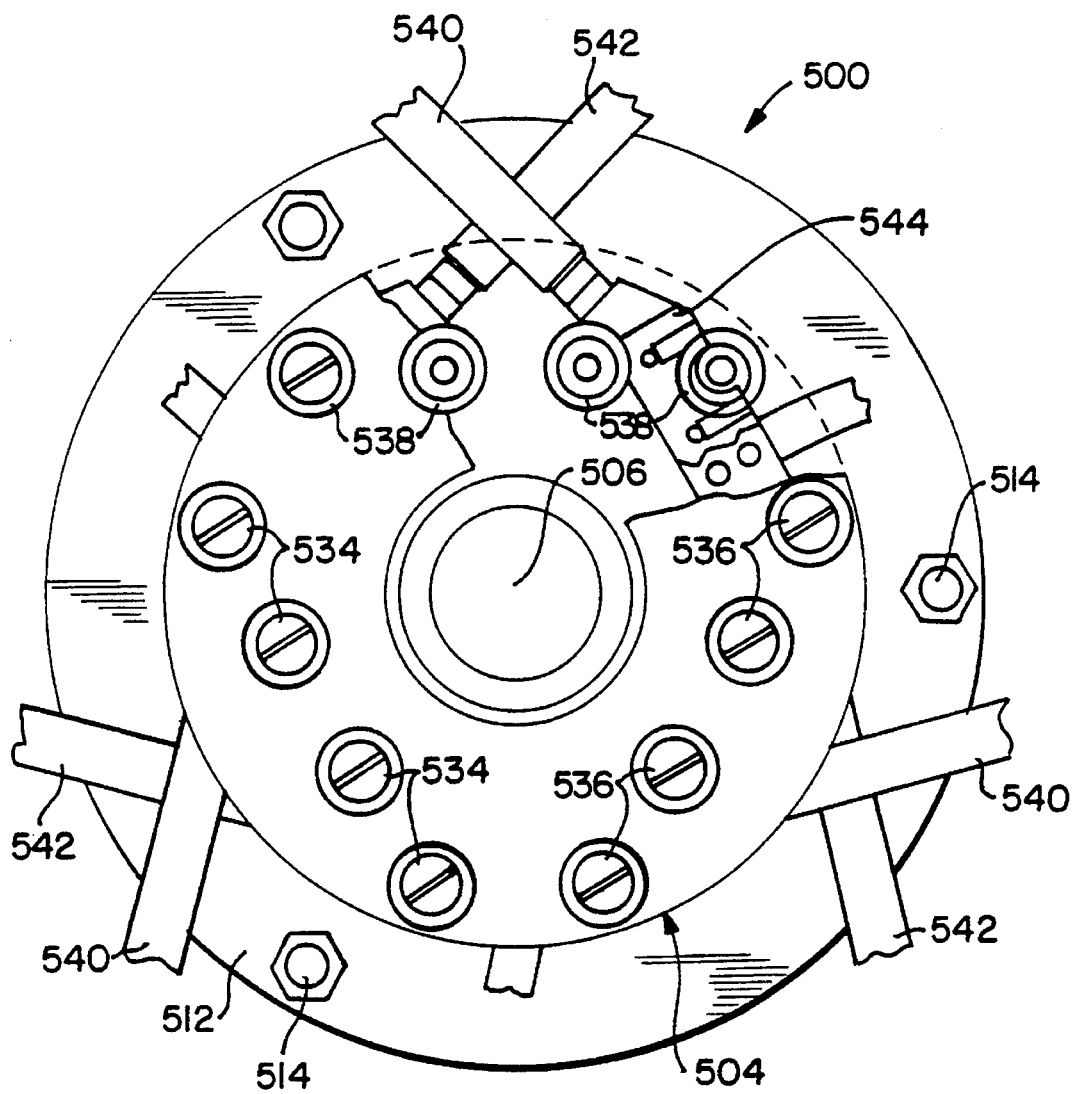
FIG. 15 is a top plan view of the electroheating apparatus of FIG. 14.

Referring now to FIGS. 14 and 15, there will be described an electroheating apparatus constructed in accordance with the preferred embodiment of the present invention and generally designated by a referenced numeral 500. The electroheating apparatus 500 is constructed from an elongated cylindrical hollow tubular housing 502 having an interior 503 constructed of electrically non-conductive material of the type previously described or interiorly coated therewith. Received within one end of the housing 502 is an inlet header 504 having a food product inlet 506. An outlet header 508 having a food product outlet 510 is contained within the other end of the housing 502. A pair of annular rings 512 are supported about each of the headers 504, 508 and are pulled longitudinally towards each other by a plurality of threaded rods 514 which circumscribe the housing 502. The threaded rods 514 pull the annular rings 512 together to maintain the headers 504, 508 sealed within the open ends of the housing 502 via suitable O-rings or the like.

The inlet header 504 is internally constructed with a plurality of longitudinal openings 516 arranged in a pattern and adapted to receive in fluid sealed relationship one end of an electrode assembly 518. Each of the electrode assemblies 518 are constructed to include an outer cylindrical barrier 520, a centrally disposed electrode 522 which define an annular gap 524 therebetween. Each of the electrode assemblies 518 are of the type as generally previously described. The open opposite ends 526 of the electrode assemblies 518 are connected together in fluid relationship by means of a U-shaped connector 528. The extending legs of the U-shaped connector 528 are inserted into the open ends 526 of an adjacent pair of electrode assemblies 518 so as to provide fluid communication with the gap 524 therein by means of internal passageway 530. In this manner, electrolyte solution can flow through the gap 524 in one direction in one electrode assembly 518, and in the opposite direction in an adjacent electrode assembly. U-shaped connectors 528 can also be used to connect together the other ends of the electrode assemblies 518 within the inlet header 504. Alternatively, the inlet header 504 may be internally provided with fluid passageways (not shown) to accommodate the flow of electrolyte solution.

A connecting passageway (not shown) within the inlet header 504 allows the electrolyte solution to flow to another pair of electrode assemblies 518 which are similarly connected at their open ends 526 by means of a connector 528. The electrolyte solution accordingly flows in a serpentine path through the annular gaps 524 of the electrode assemblies 518. In accordance with the preferred embodiment, the electrolyte solution via a connecting passageway (not shown) within the inlet header 504 allows the electrolyte solution to flow simultaneously to two pairs of electrode assemblies 518. This reduces the pressure drop of the electrolyte solution flowing with each electrode assembly 518, thereby minimizing the seepage of electrolyte solution into the food product being treated.

As thus far described, four electrode assemblies 518 are coupled together to form a first electrode bank 534. As shown in FIG. 15, a second electrode bank 536 and a third electrode bank 538, each containing four electrode assemblies 518 are positioned within the housing 502 in a triangular arrangement about 10 food product inlet 506. Although each electrode bank 534, 536, 538 is disclosed as containing four electrode assemblies 518, it is to be understood that any number of electrode assemblies may be provided. In addition, the electrode banks 534, 536, 538 may include more than three such banks and be arranged in other than triangular relationship. Electrolyte solution for each of the electrode assemblies 518 for each of the electrode banks 534, 536, 538 are fed to the inlet header 504 by means of inlets 540 and removed by means of outlets 542. An AC power supply having a frequency of 50 Hz to 99 kHz (not shown) is connected to each of the electrodes 522 within each of the electrode banks 534, 536, 538 by means of a respective one of three terminal blocks 544.

The open ends 526 of each of the electrode assemblies 518 have been described as being interconnected by means of a U-shaped connector 528. However, it is possible for the open ends 526 to be inserted into corresponding openings within the outlet header 508 as previously described with respect to the inlet header 504. However, due to the expected length of the electrode assemblies 518 needed to provide the required power to the electroheating apparatus 500, it is preferable that the electrode assemblies 518 be of shorter length. This avoids the necessity of having to employ excessively long electrode assemblies 518 which would be subject to breakage, as well as being more difficult to remove and replace if required. To this end, another similar group of first, second and third electrode banks 534', 536', 538' are similarly constructed like the first group of first, second and third electrode banks 534, 536, 538, and are similarly attached to the outlet header 508 where they receive the electrolyte solution via inlets and outlets 540', 542'. The free ends 526, 526' of the electrode banks 534, 536, 538; 534', 536', 538' are stabilized by being securely received within openings provided by an internal grill 546. The grill 546 has a plurality of circumferential openings 548 to allow the flow of liquid food products longitudinally within the housing 502 from the inlet header 506 to the outlet header 510. The first electrode banks 534, 534' are electrically connected together so as to function as a single electrode bank. Similarly, the second electrode banks 536, 536' and third electrode banks 538, 538' are respectively connected together. Thus, although the first electrode bank constitutes two banks 534, 534', it functions as a single electrode bank. Power is supplied to the electrode banks 534, 536, 538; 534' 536', 538' by means of terminal blocks 544.

As shown in FIG. 15, the electrode banks 534, 536, 538, as well as corresponding electrode banks 534', 536', 538' are connected to one phase of a three phase voltage supply, for example, 460 V at 60 Hz. By use of a three phase power supply, each of the respective electrode banks 534, 534'; 536, 536'; 538, 538' are sequentially cycled between a positive and negative voltage.

In another arrangement (not shown) a single center electrode assembly constructed as previously described is maintained at a negative voltage. Circumferentially arranged about the central electrode assembly is a plurality of outer electrode assemblies similarly constructed. The outer electrode assemblies are either individually or in groups selectively brought to a positive voltage via a three-phase power supply to effect current flow through the food product radially inward. In another embodiment, the electrode assemblies 518 may be arranged in two parallel rows with an applied single phase power supply, positive to one row and negative to another row. It is also contemplated that three parallel rows of electrode assemblies 518 can be utilized. In this regard, the center row would be connected to one pole of a single phase power supply and the outer two rows to the other pole. Accordingly, it can be appreciated that the electrode assemblies may be arranged in a variety of designs to achieve electroheating of food products pursuant to the present invention.

Figure 16:
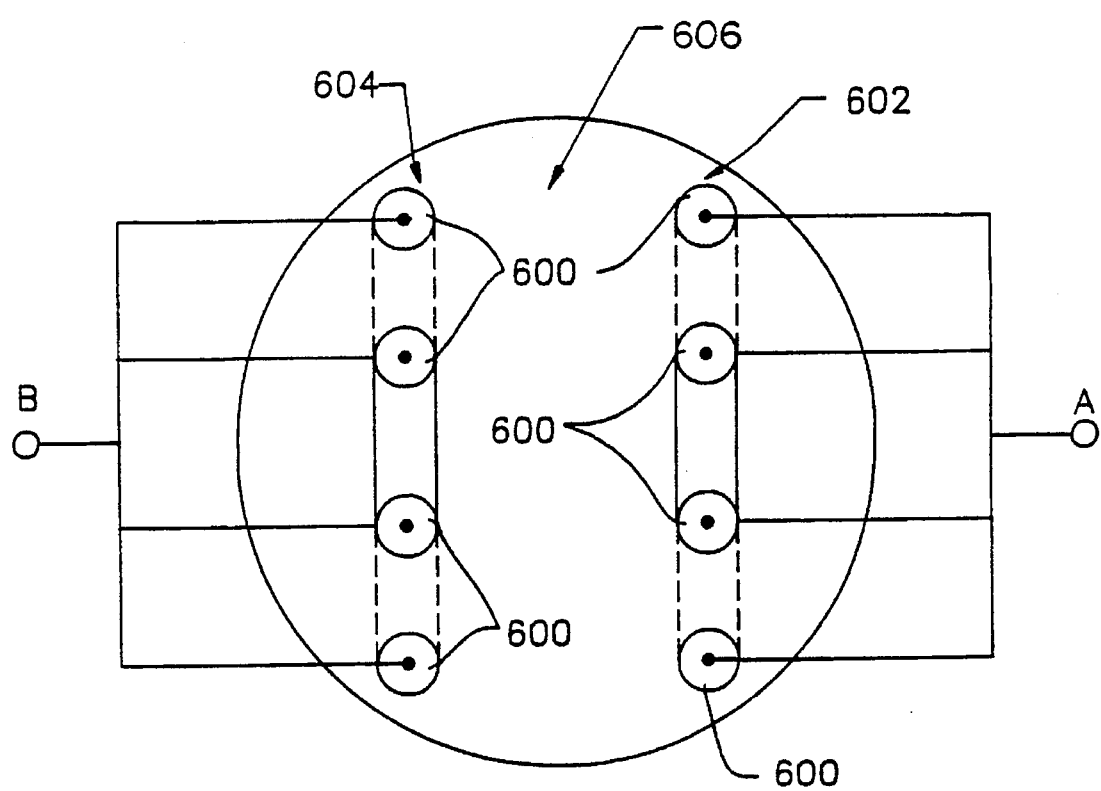
FIG. 16 is a top plan diagrammatic illustration of an electroheating apparatus including two parallel spaced apart groups of electroheating cells connected to a three-phase power source.
Figure 17:
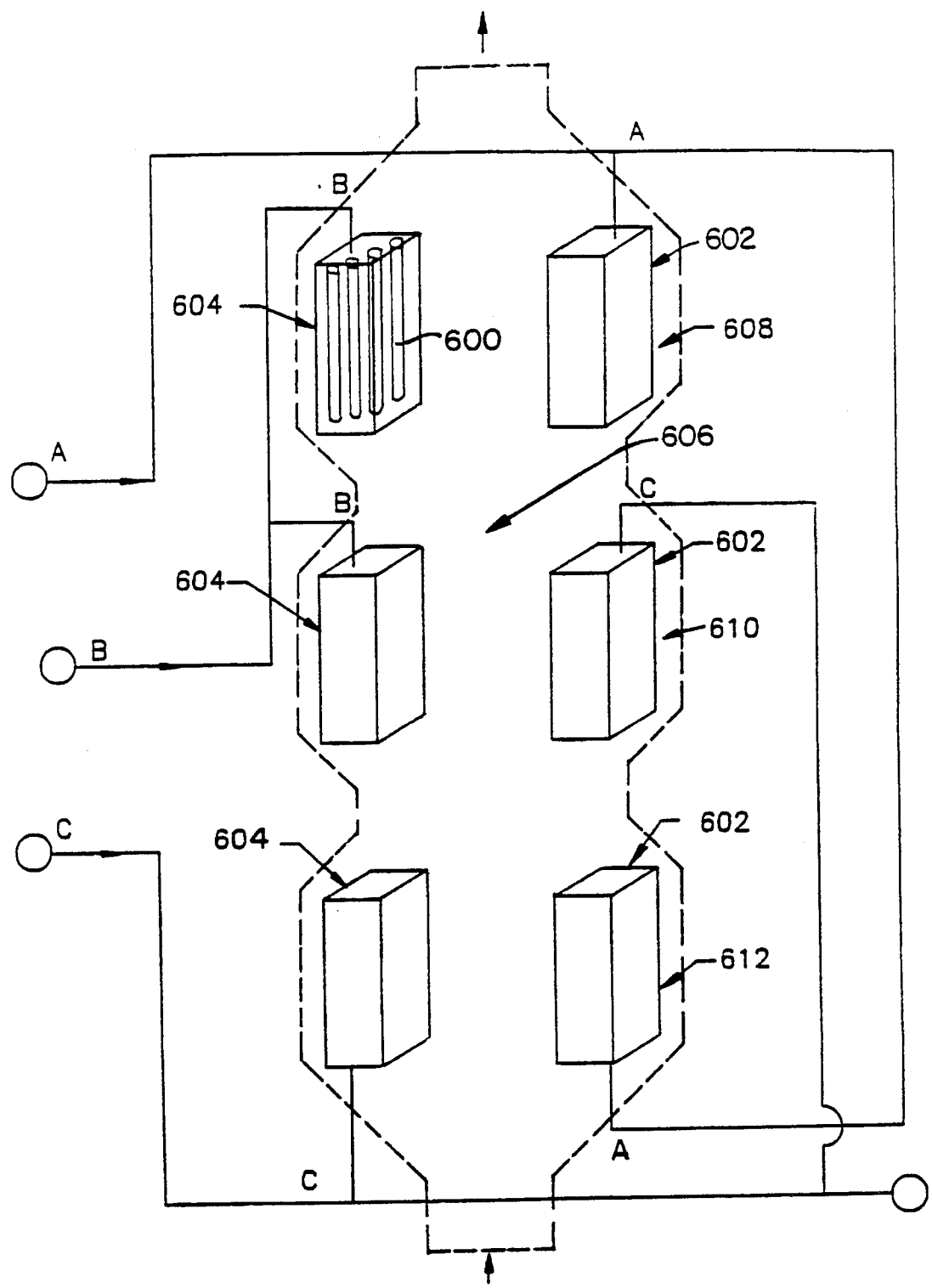
FIG. 17 is a diagrammatic illustration of the electroheating apparatus as shown in FIG. 16 wherein the apparatus is in electrical contact with a three phase power line.

Referring now to FIGS. 16 and 17, there is illustrated the arrangement of an electrode heating apparatus designated for connection to a three phase power source in accordance with another embodiment of the present invention. In this embodiment, three individual electroheating cells 10, each of which can work in a single phase mode, are connected together to a three phase power source. A plurality of electrode assemblies 600 are arranged in a group 602 and connected together in, for example, serpentine fashion for the flow of electrolyte solution therethrough as described with respect to FIG. 14. A second group 604 of electrode assemblies 600 is arranged in parallel spaced relationship to the electrode assembly group 602 to provide a heating zone 606 therebetween. Three arrays 608, 610, 612 of the thus far described electrode assembly groups 602, 604 are arranged in longitudinal alignment as shown in FIG. 17 to form a substantially continuous electroheating zone 606 extending therethrough.

The electrode assemblies 600 within the three arrays 608, 610, 612 are connected through a known SCR device in the manner diagrammatically illustrated to a three phase power source having A, B and C terminals for a respective phase. In particular, the electrodes of the first array 608 of the electrode assembly groups 602, 604 are connected respectively to the A and B terminals. The electrodes of the second array 610 of the electrode assembly groups 602, 604 are connected respectively to the B and C terminals. Finally, the electrodes of the third array 612 of the electrode assembly groups 602, 604 are respectively connected to terminals A and C. In the case where only a single array 608, 610 or 612 is employed, it may be connected to the poles of a single phase power supply for operation.

The principles, preferred embodiments, and modes of operation of the present invention have been described in the foregoing specification. The invention which is intended to be protected herein, however, is not to be construed as limited to the particular embodiments disclosed, since these are to be regarded illustrative rather than restrictive. Variations and changes may be made by others without departing from the spirit and scope of the invention.

I claim:

1. An apparatus for continuously electroheating a food product, said apparatus comprising:

an electrohetating cell including a housing, at least a pair of spaced electrode assemblies disposed in said housing, each of said electrode assemblies comprising an electrode, a porous barrier having a high degree of mechanical and thermal stability to withstand pressure differentials and long term elevated temperatures, and an electrolyte, wherein said electrolyte is located in a gap between said electrode and said barrier, and wherein said food product is in direct contact with said barrier and in electrical contact with said electrolyte through pores of said porous barrier, said electrode being in physical contact with said electrolyte but not with said food product;

a heating zone defined between said electrode assemblies for heating said food product as said food product continuously passes in a direction between said assemblies; and a source of substantially continuous alternating electrical energy having a frequency in the range of between about 50 Hz and about 99 kHz electrically connected across said electrodes so that said electrical energy has an electrical current density between said electrode assemblies which is substantially in a direction other than the direction of food flow for electroheating said food product within said heating zone sufficient to at least pasteurize said food product without significant electrolysis in said food product.

2. The apparatus of claim 1, wherein said electrode is selected from the group consisting of a plate, a solid rod, and a hollow rod.

3. The apparatus of claim 1, wherein said barrier is constructed of a non-reactive, non-metallic material having sufficient strength and dimensional stability to withstand the continuous passage of alternating electrical energy therethrough and having a porosity which is insufficient to allow significant leakage of said electrolyte or impregnation by said food product being electroheated.

4. The apparatus of claim 3, wherein said barrier is constructed from the group consisting of ceramic material and sintered glass.

5. The apparatus of claim 1, wherein said barrier provides maximum electrical current flow therethrough while providing minimum flow of said electrolyte therethrough.

6. The apparatus of claim 1, wherein said alternating electrical energy comprises a three phase energy source.

7. The apparatus of claim 1, wherein the size of said gap is about equal to the thickness of said barrier.

8. The apparatus of claim 1, further including an electrolyte inlet and an electrolyte outlet for introducing electrolyte into and removing electrolyte from said gap.

9. The apparatus of claim 1, further including means for maintaining said electrolyte under a positive pressure within said gap.

10. The apparatus of claim 1, further comprising means for cooling said electrolyte during said electroheating of said food product.

11. The apparatus of claim 1, further including a plurality of electrode assemblies arranged in a plurality of groups, each of said electrode assemblies of each of said first group being a common polarity, said groups spaced from one another to define said heating zone therebetween.

12. The apparatus of claim 11, wherein said electrical energy includes a positive phase and a negative phase connected to said electrodes of said first groups alternatively between said negative phase and said positive phase.

13. The apparatus of claim 11, wherein each of said first groups include a plurality of said electrode assemblies.

14. The apparatus of claim 11, further including a plurality of electrode assemblies arranged in a plurality of second groups, said second group spaced from one another to define said heating zone therebetween.

15. The apparatus of claim 14, wherein said electrode assemblies of said first groups are arranged in longitudinal alignment with said electrode assemblies of said second groups.

16. The apparatus of claim 15, further including means for joining together said electrode assemblies in said first and second groups in end-to-end relationship.

17. The apparatus of claim 16, wherein said means comprises a plurality of U-shaped connectors each having a passageway for the flow of said electrolyte therethrough.

18. The apparatus of claim 1, wherein said alternating electrical energy has a continuous sinusoidal wave form.

19. The apparatus of claim 1, further including means for supplying a liquid egg product to said heating zone.

20. The apparatus of claim 1, wherein the surfaces of said apparatus in contact with said food product are constructed of non-metallic material.

21. The apparatus of claim 1 wherein each of said electrode assemblies has an electrical resistance that minimizes the heat loss to the electrolyte and maximizes the energy transferred to the food product.

22. The apparatus of claim 21 wherein said food product in said heating zone has an electrical resistance, said apparatus has a total resistance that includes (1) said food resistance and (2) said electrode assembly resistances, and wherein any one of said electrode assembly resistances is less than about 5% of said total resistance.

23. An apparatus for continuously electroheating a food product, said apparatus comprising:

an electroheating cell including a housing, a plurality of spaced electrode assemblies disposed in said housing and arranged in a first, second, third and fourth group each including at least one of said electrode assemblies said electrode assemblies each comprising an electrode, a porous barrier having a high degree of mechanical and thermal stability to withstand pressure differentials and long term elevated temperatures, and an electrolyte, wherein said electrolyte is located in a gap between said electrode and said barrier, and wherein said food product is in direct contact with said barrier and in electrical contact with said electrolyte through pores of said porous barrier, said electrode being in physical contact with said electrolyte but not with said food product, said first and second group respectively arranged in longitudinal alignment with said third and fourth group;

cooling means for cooling said electrolyte during said heating of said food product;

a heating zone defined between said first and second group and said third and fourth group for heating said food product as said food product continuously passes in a direction between said assemblies; and a source of substantially continuous alternating electrical energy having a sinusoidal wave from and a frequency in the range of between about 50 Hz and about 99 kHz electrically connected across said electrodes so that said electrical energy has an electrical current density between said electrode assemblies which is substantially in a direction other than the direction of food flow, said electrical energy having a plurality of phases electrically connected to said electrodes within said first, second, third and fourth groups for electroheating said food product within said heating zone sufficient to at least pasteurize said food product without significant electrolysis in said food product.

24. The apparatus of claim 23, wherein said barrier is constructed of a non-reactive, non-metallic material having sufficient strength and dimensional stability to withstand the continuous passage of alternating electrical energy therethrough and having a porosity which is insufficient to allow significant leakage of said electrolyte or impregnation by said food product being electroheated.

25. The apparatus of claim 24, wherein said barrier provides maximum electrical current flow therethrough while providing minimum flow of said electrolyte therethrough.

26. The apparatus of claim 23, wherein said barrier is constructed from ceramic material.

27. The apparatus of claim 23, wherein the size of said gap is about equal to the thickness of said barrier.

28. The apparatus of claim 23, further including an electrolyte inlet and an electrolyte outlet for introducing electrolyte into and removing electrolyte from said gap.

29. The apparatus of claim 23, further including means for maintaining said electrolyte under a positive pressure within said gap.

30. The apparatus of claim 23, further including means for joining together said electrode assemblies in longitudinal alignment.

31. The apparatus of claim 30, wherein said means comprises a plurality of U-shaped connectors each having a passageway for the flow of said electrolyte therethrough.

32. The apparatus of claim 23, wherein said first, second, third and fourth groups each include at least a pair of said electrode assemblies.

33. The apparatus of claim 23, further including a fifth and sixth group each including at least one of said electrode assemblies, wherein said first, second and third groups and said fourth, fifth and sixth group are each arranged in triangular relationship.

34. The apparatus of claim 33, wherein a negative phase of said electrical energy is alternately applied to one of said electrode assemblies within said first, second and third groups while a positive phase of said electrical energy is applied to the remaining electrode assemblies of the other of said first, second and third groups.

35. The apparatus of claim 34, wherein a negative phase of said electrical energy is alternately applied to one of said electrode assemblies within said fourth, fifth and sixth groups while a positive phase of said electrical energy is applied to the remaining electrode assemblies of the other of said fourth, fifth and sixth groups.

36. The apparatus of claim 23, wherein said housing includes a liquid egg product inlet and outlet.

37. The apparatus of claim 23, wherein the surfaces of said apparatus in contact with said food product are constructed of non-metallic material.

38. The apparatus of claim 23 wherein each of said electrode assemblies has an electrical resistance that minimizes the heat loss to the electrolyte and maximizes the energy transferred to the food product.

39. The apparatus of claim 38 wherein said food product in said heating zone has an electrical resistance, said apparatus has a total resistance that includes (1) said food resistance and (2) said electrode assembly resistances, and wherein any one of said electrode assembly resistances is less than about 5% of said total resistance.

\* \* \* \* \*